(12) United States Patent
Sakaguchi et al.

(10) Patent No.: US 12,217,917 B2
(45) Date of Patent: *Feb. 4, 2025

(54) SOLID ELECTROLYTIC CAPACITOR WITH SMALL EQUIVALENT SERIES RESISTANCE AND METHOD FOR MANUFACTURING THE SAME

(71) Applicant: RUBYCON CORPORATION, Nagano (JP)

(72) Inventors: Masayuki Sakaguchi, Nagano (JP); Tetsushi Ogawara, Nagano (JP); Yoshishige Sakurai, Nagano (JP); Akira Iijima, Nagano (JP); Yosuke Nozawa, Nagano (JP)

(73) Assignee: RUBYCON CORPORATION, Nagano (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/408,702

(22) Filed: Jan. 10, 2024

(65) Prior Publication Data

US 2024/0145178 A1    May 2, 2024

Related U.S. Application Data

(63) Continuation of application No. 17/612,344, filed as application No. PCT/JP2020/023923 on Jun. 18, 2020, now Pat. No. 11,908,632.

(30) Foreign Application Priority Data

Jun. 25, 2019 (JP) .................. 2019-117874

(51) Int. Cl.
*H01G 9/035* (2006.01)
*H01G 9/00* (2006.01)
(Continued)

(52) U.S. Cl.
CPC ........... *H01G 9/035* (2013.01); *H01G 9/0036* (2013.01); *H01G 9/028* (2013.01); *H01G 9/151* (2013.01)

(58) Field of Classification Search
CPC ...... H01G 9/025; H01G 9/0036; H01G 9/035; H01G 9/151; H01G 9/028
See application file for complete search history.

(56) References Cited

U.S. PATENT DOCUMENTS 11,908,632 B2 *   2/2024   Sakaguchi ........... H01G 9/0036
2009/0109602 A1 *  4/2009   Kakuma .................. H01G 9/15
                                                              29/25.03
(Continued)

*Primary Examiner* — David M Sinclair
(74) *Attorney, Agent, or Firm* — Stephen J. Weyer, Esq.; Stites & Harbison, PLLC

(57) ABSTRACT

A solid electrolytic capacitor (1) includes an anode foil (2a) having formed thereon an oxide film, a cathode foil (2c), and a separator (2d), and is equipped with a solid electrolyte (20) formed of an electroconductive polymer compound in a fine particle form, and a water-soluble compound solution (30) introduced to surround the solid electrolyte (20), the solid electrolyte (20) contains a polyol compound having a molecular weight of less than 200 and a number of hydroxy groups of 4 or more as a first water-soluble compound (2/1), the water-soluble compound solution (30) contains one kind or multiple kinds of a glycol compound in a liquid form as a second water-soluble compound (2/2), and the second water-soluble compound (2/2) has an average molecular weight of less than 400.

6 Claims, 12 Drawing Sheets

(51) Int. Cl.
*H01G 9/028* (2006.01)
*H01G 9/15* (2006.01)

(56) References Cited

U.S. PATENT DOCUMENTS

2015/0287540 A1* 10/2015 Koseki ................... H01G 9/035
  427/80
2018/0218844 A1* 8/2018 Sato ....................... H01G 9/151
2018/0334577 A1* 11/2018 Matsubayashi ........ H01G 9/048

* cited by examiner

FIG.5A        FIG.5B        FIG.5C
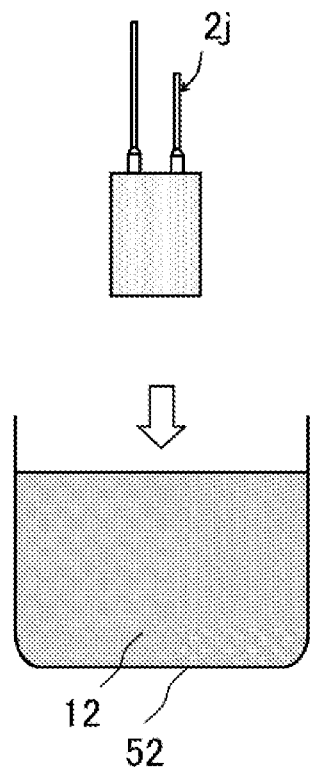
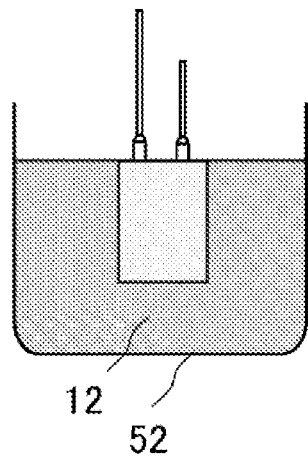
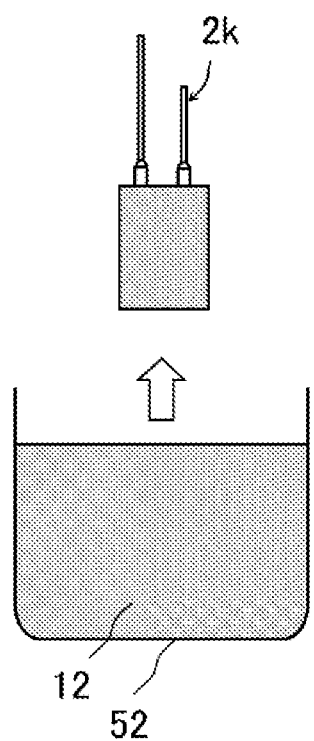
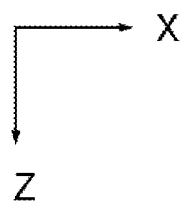

FIG.7A    FIG.7B    FIG.7C
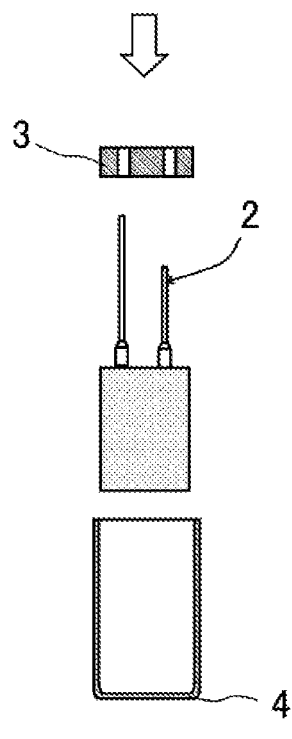
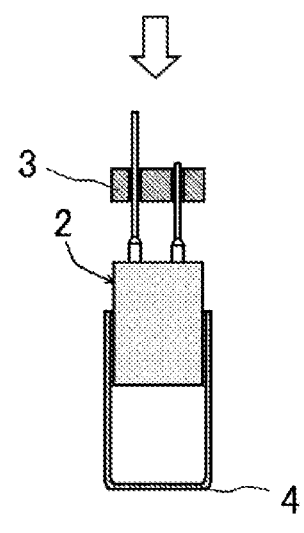
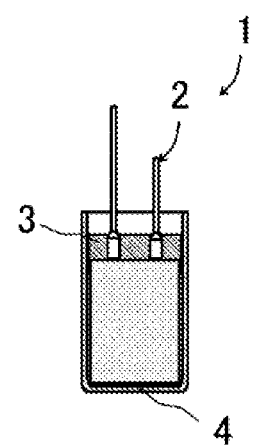
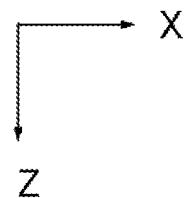

SOLID ELECTROLYTIC CAPACITOR WITH SMALL EQUIVALENT SERIES RESISTANCE AND METHOD FOR MANUFACTURING THE SAME

TECHNICAL FIELD

The present invention relates to a solid electrolytic capacitor and manufacturing method thereof.

BACKGROUND ART

A solid electrolytic capacitor containing an electroconductive polymer compound is excellent in temperature stability and has such characteristics as a small equivalent series resistance (abbreviation: ESR). For example, a dispersing liquid having dispersed therein an electroconductive polymer compound in a fine particle form is introduced to a gap between an anode foil and a cathode foil and dried to form a solid electrolyte. Thereafter, a water-soluble compound solution in a liquid form containing a water-soluble compound is introduced to the formed solid electrolyte. In the description herein, an equivalent series resistance may be hereinafter expressed by ESR in some cases.

A solid electrolytic capacitor in which a liquid composition has glycerin, polyglycerin, or diethylene glycol as the first component, and polyethylene glycol as the second component has been proposed (PTL 1: WO 2017/094242). An example has been described in which in a solid electrolytic capacitor, a capacitor is impregnated with a dispersing liquid obtained by agitating a dispersing liquid containing an electroconductive polymer compound in a fine particle form along with diglycerol (PTL 2: JP-A-2012-186452). It has been described that in a solid electrolytic capacitor, polyethylene glycol is contained for repairing an oxide film (PTL 3: JP-A-2018-026542).

CITATION LIST

Patent Literatures

PTL 1: WO 2017/094242
PTL 2: JP-A-2012-186452
PTL 3: JP-A-2018-026542

SUMMARY OF INVENTION

Technical Problem

In the technical field of capacitors, a capacitor having a leak current and ESR that are reduced than before has been always demanded, which is no exception for the technical field of solid electrolytic capacitors. In the ordinary techniques, the target leak current reducing effect has not been obtained due to such factors as the insufficient coat repairing capability of the hydrophilic macromolecule compound. Furthermore, although the ESR is reduced than before by using an electroconductive polymer compound, the ordinary techniques have an issue that the ESR cannot be reduced to the target level for a solid electrolytic capacitor having ESR at the use frequency that is further reduced, for example, a solid electrolytic capacitor having ESR at a use frequency of 100 kHz that is further reduced.

In the manufacture of a solid electrolytic capacitor, the solid electrolyte has been formed in such a manner that a dispersing liquid containing an electroconductive polymer compound in a fine particle form and a water-soluble compound is introduced to a capacitor element, and the solvent is removed therefrom at a high temperature. The ordinary techniques use glycerin as the water-soluble compound in the dispersing liquid, and has an issue that glycerin is removed along with the solvent in the formation of the solid electrolyte. In view of the issue, diglycerin and polyglycerin, which are substances having a higher boiling point than glycerin, can be allowed to remain in the solid electrolyte even in the case where the solvent is removed at a high temperature in the formation of the solid electrolyte. Furthermore, diglycerin and polyglycerin contained in the solid electrolyte can modify the aligning property of the electroconductive polymer compound in a fine particle form to enhance the electroconductivity. On the other hand, an issue has been newly found that in the case where polyglycerin is allowed to remain in the solid electrolyte in a sufficient amount, the electroconductivity is impaired due to the entrance thereof into among particles of the electroconductive polymer compound in a fine particle form, which becomes a factor increasing the ESR of the solid electrolytic capacitor.

Solution to Problem

The present invention has been made in view of the aforementioned circumstances, and an object thereof is to provide a solid electrolytic capacitor having a configuration in which the target electrostatic capacity is provided, the ESR at the use frequency is reduced than before, and the oxide film repairing capability is enhanced to enhance the leak current reducing effect, in such a manner that a polyol compound having a small molecular weight and having a large number of hydroxy groups is positively contained as a first water-soluble compound in the solid electrolyte to improve the contact to the oxide film, and simultaneously a water-soluble compound solution containing a second water-soluble compound having an order of the average molecular weight regulated with respect to the polyol compound is used, and a method for manufacturing the same.

The present invention has been accomplished under the solutions as disclosed below.

The solid electrolytic capacitor of the present invention includes an anode foil having formed thereon an oxide film, a cathode foil, and a separator disposed between the anode foil and the cathode foil, and is equipped with a solid electrolyte formed of an electroconductive polymer compound in a fine particle form, and a water-soluble compound solution introduced to surround the solid electrolyte, the solid electrolyte contains a polyol compound having a molecular weight of less than 200 and a number of hydroxy groups of 4 or more as a first water-soluble compound, the water-soluble compound solution contains one kind or multiple kinds of a glycol compound in a liquid form as a second water-soluble compound, and the second water-soluble compound has an average molecular weight of less than 400.

According to the configuration, the target electrostatic capacity can be achieved, and the ESR at the use frequency can be reduced than before, since the polyol compound having a small molecular weight and having a large number of hydroxy groups is positively contained as the first water-soluble compound to provide a structure having a uniform solid electrolyte formed on an anode oxide film, and one kind or multiple kinds of the glycol compound in a liquid form is positively contained as the second water-soluble compound to enhance drastically the compatibility with the first water-soluble compound in the solid electrolyte, resulting in the good contact to the oxide film and the further increased leak current reducing effect. Furthermore, a solid electrolytic capacitor having a structure in which the bulge thereof can be prevented in the case where the solid electrolytic capacitor is under a high temperature environment, such as in reflowing, or in the case where the solid electrolytic capacitor is used for a long period of time.

The method for manufacturing a solid electrolytic capacitor of the present invention is a method for manufacturing a solid electrolytic capacitor having a configuration including an anode foil having formed thereon an oxide film, a cathode foil, a separator disposed between the anode foil and the cathode foil, and a solid electrolyte, the method includes forming the solid electrolyte in a gap between the anode foil and the cathode foil with a dispersing liquid containing an electroconductive polymer compound in a fine particle form and a polyol compound having a molecular weight of less than 200 and a number of hydroxy groups of 4 or more as a first water-soluble compound, and then introducing a water-soluble compound solution containing one kind or multiple kinds of a glycol compound in a liquid form as a second water-soluble compound to surround the formed solid electrolyte, and the second water-soluble compound has an average molecular weight of less than 400.

According to the configuration of the present invention, the aligning property of the electroconductive polymer compound in a fine particle form can be enhanced, and the conductivity between the electroconductive polymer compound and the electroconductive polymer compound is not impaired, by positively using the polyol compound having a small molecular weight and having a large number of hydroxy groups as the first water-soluble compound, which is difficult to remove in the manufacture of the solid electrolytic capacitor. The second water-soluble compound having an average molecular weight of less than 400 secures the introduction thereof to among the electroconductive polymer compound in a fine particle form, securing the electroconductivity of the solid electrolyte and reducing the leak current. Furthermore, a solid electrolytic capacitor having a target electrostatic capacity and ESR at the use frequency that is reduced than before can be produced since the use of the water-soluble compound solution positively containing the glycol compound in a liquid form as the second water-soluble compound drastically enhances the compatibility with the polyol compound in the solid electrolyte, thereby resulting in good contact to the oxide film and enhancing the leak current reducing effect. Examples of the second water-soluble compound include ethylene glycol, propylene glycol, diethylene glycol, triethylene glycol, polyethylene glycol in a liquid form, and known glycol compounds in a liquid form.

A configuration in which the average molecular weight of the second water-soluble compound is 300 or less is preferred since the ESR at a low temperature can be reduced. A configuration in which the average molecular weight of the second water-soluble compound is more than 0.4 time and less than 1.8 times the molecular weight of the first water-soluble compound is preferred since the target electrostatic capacity can be achieved, the ESR at the use frequency can be reduced than before, the oxide film repairing capability can be enhanced to enhance the leak current reducing effect, and the ESR can be retained small while suppressing the change of the electrostatic capacity in a high temperature load test. A configuration in which the average molecular weight of the second water-soluble compound is more than 0.4 time and less than 1.2 times the molecular weight of the first water-soluble compound is more preferred. A configuration in which the solid electrolyte contains diglycerin as the first water-soluble compound in an amount of 80 wt % or more is preferred since a structure having the solid electrolyte favorably formed on the anode oxide film can be obtained. A configuration in which the water-soluble compound solution contains water in an amount of 0.5 wt % or more is preferred since the anode oxide film repairing function of the water-soluble compound solution can be sufficiently exerted, and the defect repairing efficiency of the oxide film can be sufficiently enhanced. A configuration in which the water-soluble compound solution contains water in an amount of 0.7 wt % or more is more preferred.

As for the water-soluble compound solution, a configuration in which an ionic compound per unit mass of the water-soluble compound solution is less than 2 mol/kg is preferred, a configuration with less than 1 mol/kg is more preferred, and a configuration with less than 0.3 mol/kg is further preferred. A nonionic compound is preferably used as the second water-soluble compound. As for the water-soluble compound solution, a configuration in which no ionic compound contained is preferred. These configurations are preferred since deterioration can be prevented. Specifically, in the case where the water-soluble compound solution contains an ionic compound in a high concentration, the reaction of the ionic compound and the electrode foil is activated when the ionic compound is concentrated due to the transpiration of the water-soluble compound solution under a high temperature condition or the like, which results in a concern of deterioration of the electrode foil. The reduction of the average molecular weight of the water-soluble compound acts in the direction of promoting the transpiration under a high temperature condition or the like, and therefore the phenomenon may become conspicuous specifically in the case where the average molecular weight of the second water-soluble compound is reduced, for example, where the average molecular weight of the second water-soluble compound is less than 400. Against the phenomenon, in the case where the amount of the ionic compound in the water-soluble compound solution is sufficiently reduced, the deterioration of the electrode foil can be prevented even when the water-soluble compound solution is transpirated.

In particular, in the case where the average molecular weight of the second water-soluble compound is reduced to 300 or less, the case reduced to 250 or less, the case reduced to 200 or less, and the case reduced to less than 200, when the amount of the ionic compound in the water-soluble compound solution is sufficiently reduced, the target electrostatic capacity can be achieved, the ESR at the use frequency can be reduced than before, the oxide film repairing function can be enhanced to enhance the leak current reducing effect, and the ESR can be retained small while suppressing the change of the electrostatic capacity in a high temperature load test, as described above, and simultaneously the deterioration of the electrode foil can be prevented even when the water-soluble compound solution is transpirated.

Advantageous Effects of Invention

According to the present invention, a structure having a uniform solid electrolyte formed in the anode oxide film can be provided, and the compatibility with the polyol compound in the solid electrolyte is drastically enhanced, resulting in the good contact to the oxide film and the further increased leak current reducing effect. Accordingly, the present invention can achieve a solid electrolytic capacitor having a configuration that is capable, for example, of reducing the ESR at a use frequency of 100 kHz than before, and for example, of increasing the electrostatic capacity than the ordinary technique to provide the target electrostatic capacity.

BRIEF DESCRIPTION OF DRAWINGS

FIG. 5A is an illustration showing a preparation step in a dispersing liquid filling treatment, FIG. 5B is an illustration showing a dipping step subsequent to the preparation step in the dispersing liquid filling treatment, and FIG. 5C is an illustration showing a lifting-up step subsequent to the dipping step in the dispersing liquid filling treatment, in the present embodiment.

FIG. 7A is an illustration showing a preparation step in a fitting treatment, FIG. 7B is an illustration showing an insertion step subsequent to the preparation step in the fitting treatment, and FIG. 7C is an illustration showing a fitting step subsequent to the insertion step in the fitting treatment.

DESCRIPTION OF EMBODIMENTS

Structures and the like of a capacitor element 2 according to the present embodiment of the present invention will be described.

Figure 1:
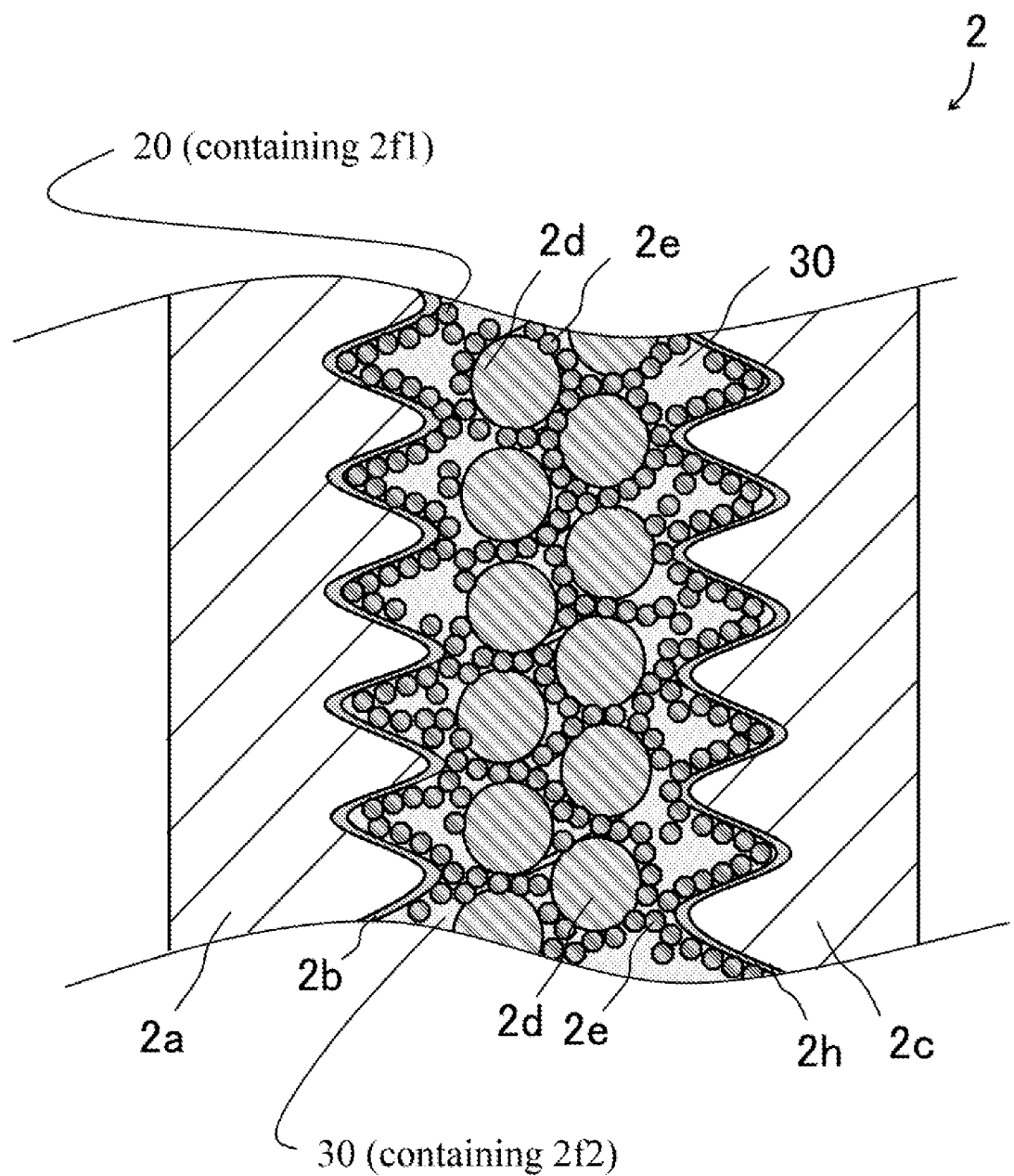
FIG. 1 is an illustration schematically showing a main part of a capacitor element in an embodiment of the present invention.

FIG. 1 is an illustration schematically showing a main part of the capacitor element 2 in a solid electrolytic capacitor 1 of the present embodiment. An anode foil 2a and a cathode foil 2c each are formed of a valve metal, such as aluminum, tantalum, and niobium. The surface of the anode foil 2a is roughened through an etching treatment, and then an oxide film 2b is formed thereon through a chemical conversion treatment. The surface of the cathode foil 2c is roughened through an etching treatment as similar to the anode foil 2a, and then a spontaneous oxidation coat 2h is formed thereon. For example, the anode foil 2a and the cathode foil 2c each are formed of aluminum. In all the figures for describing the embodiments, members having the same function are attached with the same symbol, and the repeating explanation thereof may be omitted in some cases.

A separator 2d is disposed between the anode foil 2a and the cathode foil 2c. The separator 2d may be formed, for example, of cellulose fibers having good chemical affinity to an electroconductive polymer and a water-soluble polymer, or a synthetic resin excellent in heat resistance, such as nylon, polypropylene (PP), polyethylene (PE), polyethylene terephthalate (PET), and polyphenylene sulfide (PPS). For example, heat resistant cellulose paper may be applied to the separator 2d.

In the present embodiment, as shown in FIG. 1, a solid electrolyte 20 and a water-soluble compound solution 30 are introduced to a gap between the anode foil 2a and the cathode foil 2c in such a manner that the water-soluble compound solution 30 surrounds the solid electrolyte 20. On the anode side, the solid electrolyte 20 is formed to be brought into contact with the oxide film 2b of the anode foil 2a. For example, the solid electrolyte 20 is formed layeredly. The solid electrolyte 20 contains an electroconductive polymer compound 2e in a fine particle form having a nanometer order size and a first water-soluble compound 2f1. The water-soluble compound solution 30 is introduced to surround the solid electrolyte 20. The water-soluble compound solution 30 contains a second water-soluble compound 2f2. The water-soluble compound solution 30 contains water in a prescribed ratio, and thus has a configuration having an excellent oxide film repairing capability for repairing the oxide film 2b of the anode foil 2a.

The electroconductive polymer compound 2e contains, for example, poly(3,4-ethylene dioxythiophene) (PEDOT), poly(3,4-ethylene dioxythiophene) doped with poly(4-styrenesulfonic acid) (PEDOT/PSS), tetracyanoquinodimethane (TCNQ), polypyrrole (PPy), polyaniline (PANI), polythiophene (PT), and other known electroconductive polymer compounds.

According to the configuration, a high withstanding voltage can be achieved, and for example, the withstanding voltage can be increased to 100 V. The electroconductive polymer compound 2e preferably contains an electroconductive polymer compound doped with at least one kind of poly(styrenesulfonic acid), toluenesulfonic acid, an alkylbenzenesulfonic acid, and naphthalenesulfonic acid, as a dopant. According to the configuration, the electroconductivity can be stabilized.

For example, the average particle diameter of the electroconductive polymer compound 2e is 1 nm or more and 300 nm or less. In the case where the average particle diameter of the electroconductive polymer compound 2e is less than 1 nm, the electroconductive polymer compound in a fine particle form may be difficult to manufacture in some cases. In the case where the average particle diameter of the electroconductive polymer compound 2e exceeds 300 nm, the electroconductive polymer compound 2e may be difficult to introduced to etching pits (concavities) on the surface of the anode foil 2a in some cases. From this standpoint, the average particle diameter of the electroconductive polymer compound 2e is particularly preferably 2 nm or more, and more preferably 3 nm or more. The average particle diameter of the electroconductive polymer compound 2e is particularly preferably 200 nm or less, and more preferably 100 nm or less.

Figure 2A:
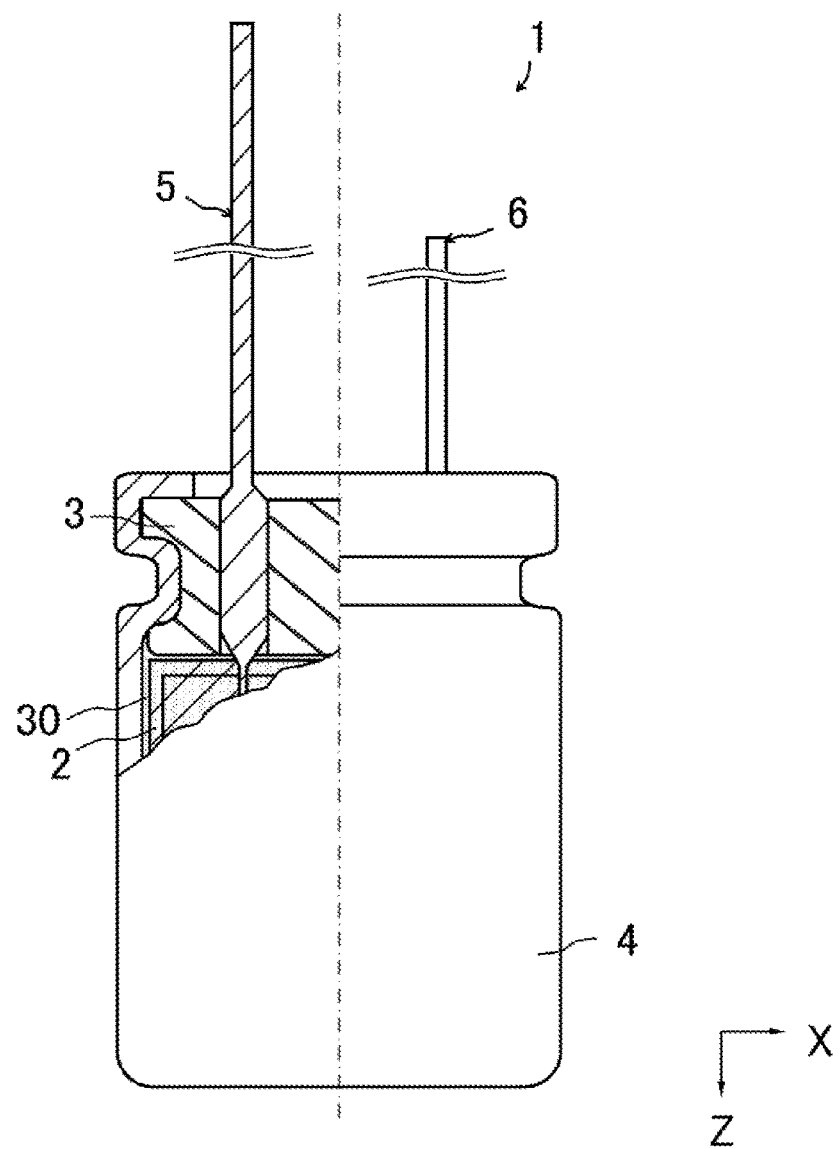
FIG. 2A is a schematic partial cross-section view showing a structure of a solid electrolytic capacitor having the important part shown in FIG. 1.

FIG. 2A is a schematic partial cross-section view showing, for example, a structure of the solid electrolytic capacitor 1 of the present embodiment. The solid electrolytic capacitor 1 has a configuration equipped with the capacitor element 2 having the solid electrolyte 20 containing the electroconductive polymer compound 2e in a fine particle form and the first water-soluble compound 2f1 formed therein, a lead terminal 5, a lead terminal 6, a sealing part 3 having through holes formed at two positions, a metal case 4 having a shape with a bottom for housing the capacitor element 2, and the water-soluble compound solution 30 introduced to surround the solid electrolyte 20, with the opening side of the case 4 being sealed with the sealing part 3. For the convenience of explanation of the positional relationship of the members of the solid electrolytic capacitor 1, the directions are shown by the arrows X, Y, and Z in the figures. In the practical use of the solid electrolytic capacitor 1, the direction thereof is not limited to these directions, and the solid electrolytic capacitor may be used in any direction.

Figure 2B:
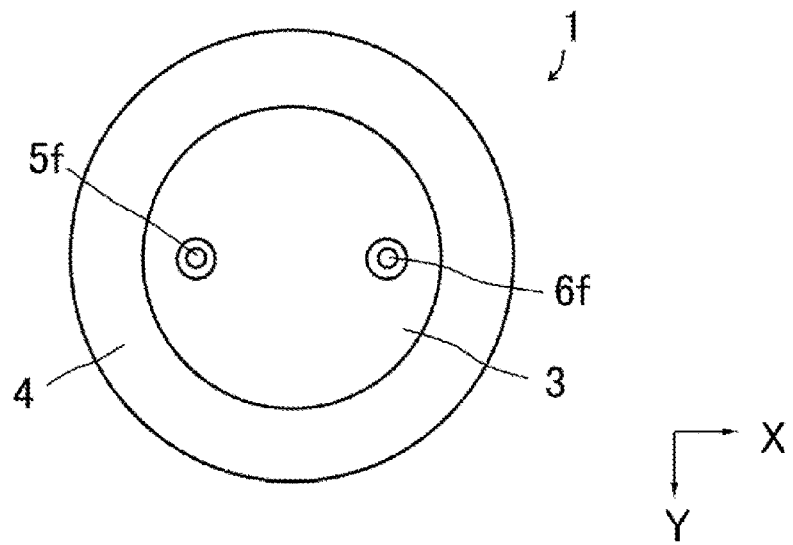
FIG. 2B is a schematic illustration of the solid electrolytic capacitor having the important part shown in FIG. 1 viewed from an opening side of a case.

In the example shown in FIGS. 2A and 2B, a side throttling part is formed on the side surface on the opening side of the case 4, and the end on the opening side thereof is bent. On the opening side of the case 4, the capacitor element 2 is not disposed, but a part of a first surface of the sealing part 3 and a lead-out terminal of the lead terminal 5 (6) are exposed. The sealing part 3 is supported and fixed with the side throttling part and the end of the opening of the case 4. A round bar part of the lead terminal 5 (6) is fit to the through hole of the sealing part 3 and supported and fixed with the sealing part 3.

The case 4 has a cylindrical shape with a bottom and is formed of a metal, such as aluminum. The sealing part 3 has high airtightness for preventing the invasion of water and the scatter of the oxide film repairing substance, and has a substantially cylindrical shape corresponding to the inner shape of the case 4. The sealing part 3 may be formed, for example, of an insulating rubber composition. For example, isobutylene-isoprene rubber, butyl rubber, ethylene-propylene rubber, fluoro rubber, and other known elastomers may be applied to the sealing part 3.

The lead-out terminal in the lead terminal 5 (6) may be formed, for example, of a tin-plated copper-covered steel wire (CP wire). According to the configuration, soldering to an external circuit board or the like can be readily performed. The lead-out terminal may be in the form of a round pin or an angular pin depending on cases. The lead terminal 5 is bonded to the anode foil 2a, and the lead terminal 6 is bonded to the cathode foil 2c. The length of a lead-out terminal 5f of the lead terminal 5 is larger than the length of a lead-out terminal 6f of the lead terminal 6, which enhances the visibility of the polarity. For example, the lead terminal 5 and the lead terminal 6 have the same shape and the same structure except for the difference of the length of the lead-out terminal. For example, a flat part, a first step part, and the round bar part in the lead terminal and the lead terminal 6 are formed of aluminum and formed through press work.

Subsequently, the method for producing the solid electrolytic capacitor 1 according to the present embodiment will be described below.

Figure 8:
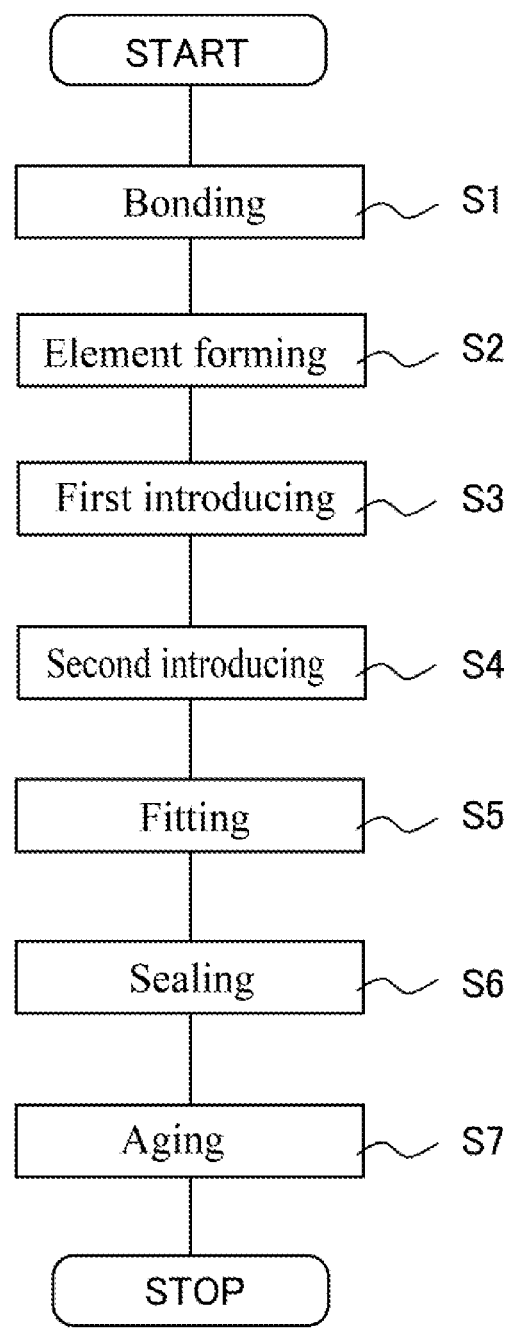
FIG. 8 is a flow chart showing a manufacture procedure of the solid electrolytic capacitor of the present embodiment.
Figure 9A:
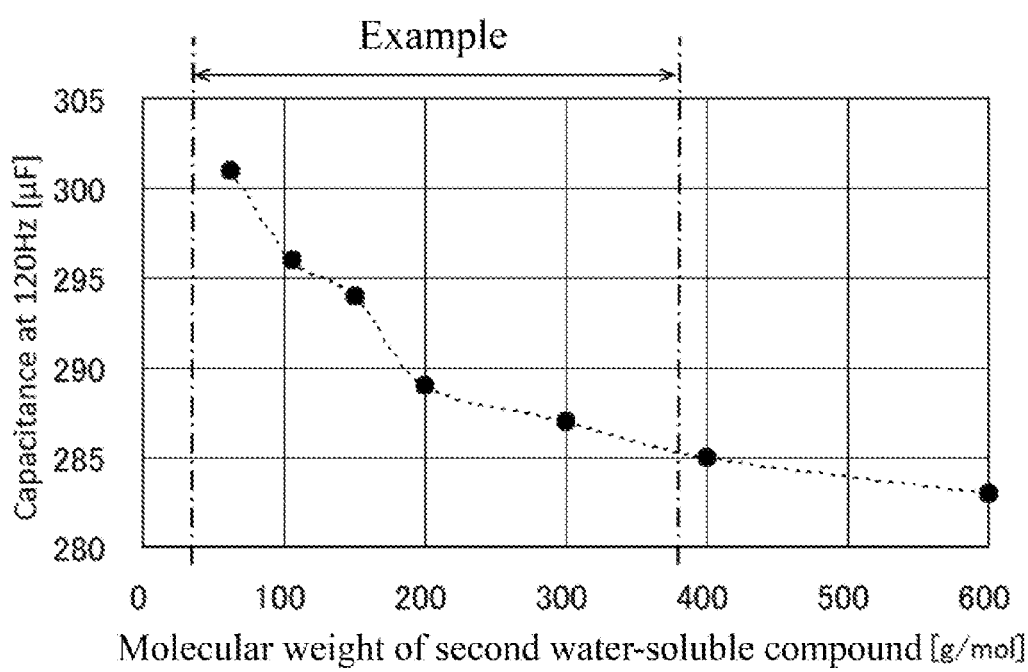
FIG. 9A is a graph showing by comparison the relationship between the average molecular weight of the second water-soluble compound and the electrostatic capacity at a frequency of 120 Hz for Examples and Comparative Examples.
Figure 9B:
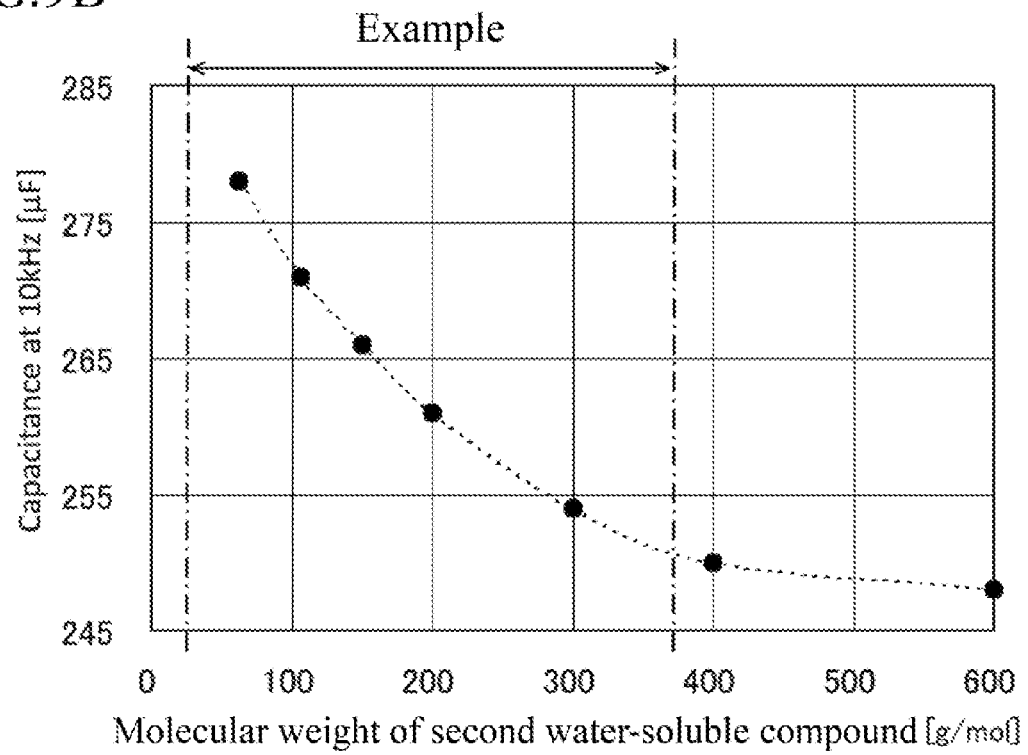
FIG. 9B is a graph showing by comparison the relationship between the average molecular weight of the second water-soluble compound and the electrostatic capacity at a frequency of 10 kHz for Examples and Comparative Examples.
Figure 10A:
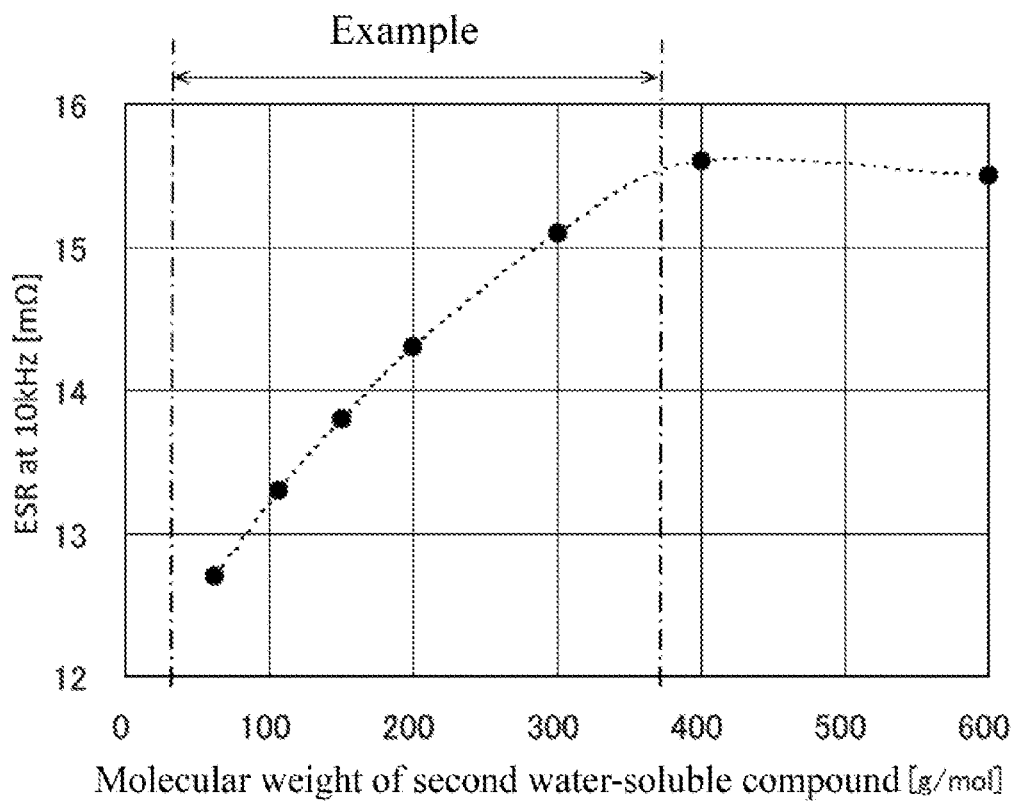
FIG. 10A is a graph showing by comparison the relationship between the average molecular weight of the second water-soluble compound and the ESR at a frequency of 10 kHz for Examples and Comparative Examples.
Figure 10B:
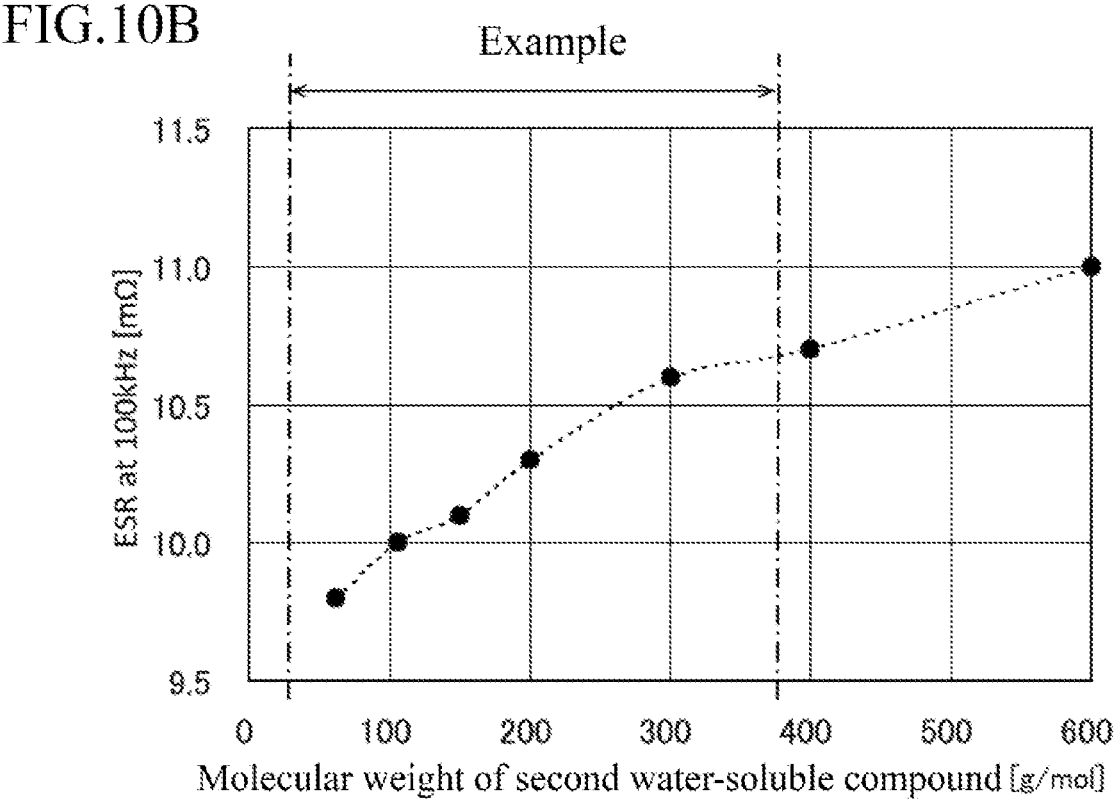
FIG. 10B is a graph showing by comparison the relationship between the average molecular weight of the second water-soluble compound and the ESR at a frequency of 100 kHz for Examples and Comparative Examples.
Figure 11:
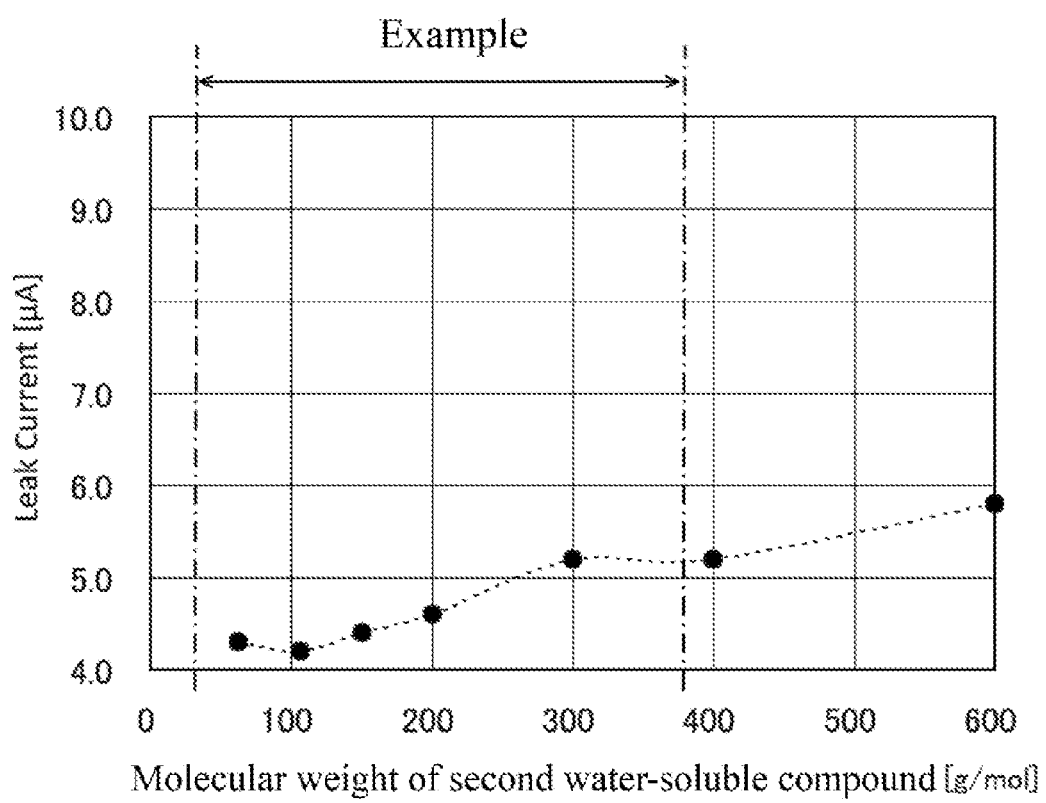
FIG. 11 is a graph showing by comparison the relationship between the average molecular weight of the second water-soluble compound and the leak current for Examples and Comparative Examples.

FIG. 8 is a flow chart showing a manufacture procedure of the solid electrolytic capacitor 1. The solid electrolytic capacitor 1 is produced, for example, by a bonding step S1, an element forming step S2, a first introducing step S3, a second introducing step S4, a fitting step S5, a sealing step S6, and an aging step S7 in this order. In addition to the manufacture procedure shown above, the order of the second introducing step S4 and the fitting step S5 may be transposed. The sealing step S6 may be provided after the aging step S7. The fitting step S5 and the sealing step S6 may be provided after the aging step S7.

In the bonding step S1, for example, the flat part of the lead terminal 5 and the anode foil 2a are overlapped, plural bonding sites are formed with a regular interval by piercing with a needle or the like at prescribed positions, and the burr portion thus formed is pressed to bond to the anode foil 2a, enabling electric contact. The procedure is the same as for the cathode foil 2c. The electric contact state is stabilized with bonding sites at plural positions, and therefore the number of the bonding sites may be 2, 3, or 4 or more depending on cases.

Figure 3:
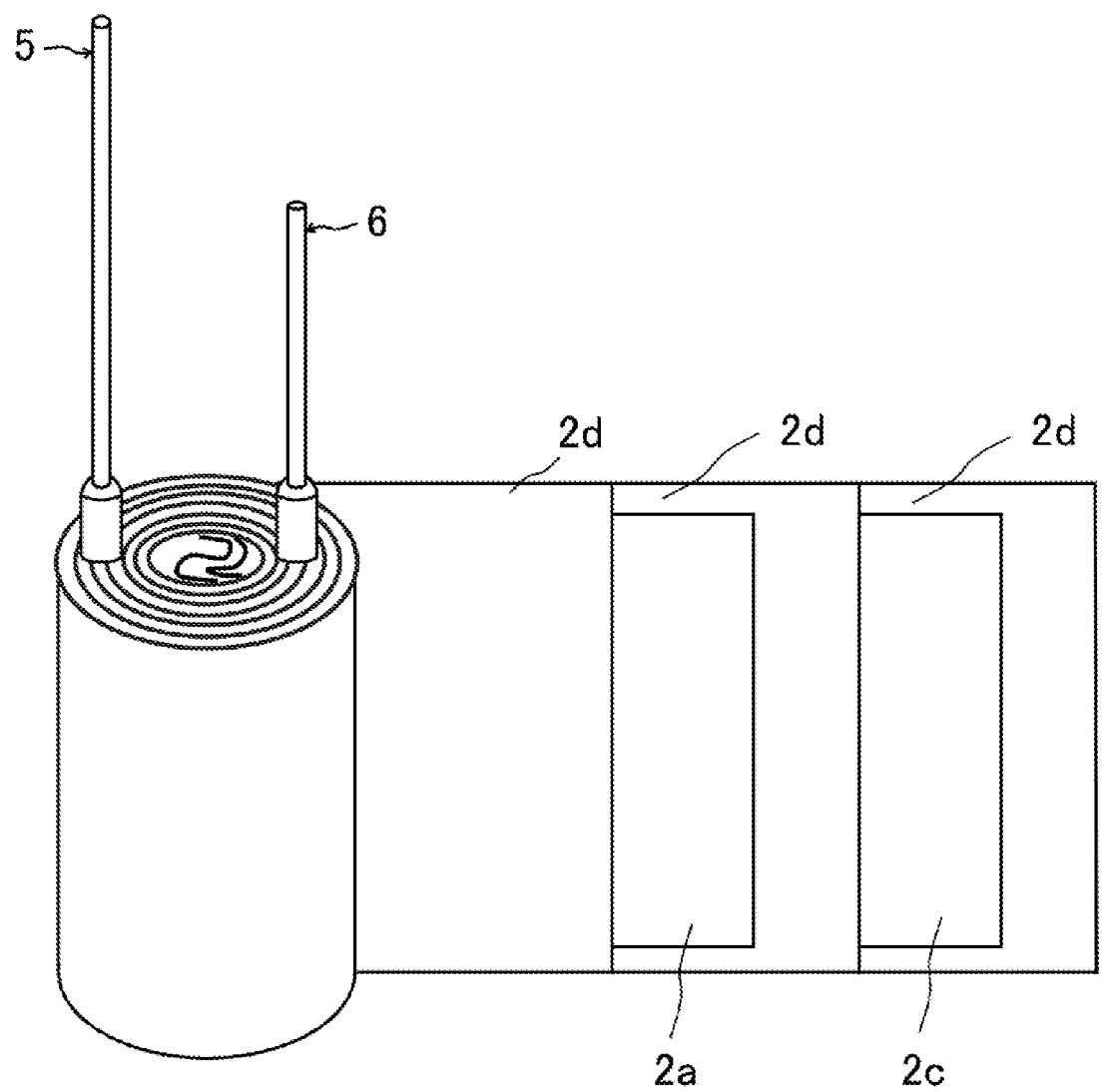
FIG. 3 is an illustration showing a state where in the present embodiment, an anode foil having a lead terminal bonded thereto, a cathode foil having a lead terminal bonded thereto, and a separator are overlapped on each other and wound.
Figures 4A, 4B, 4C:
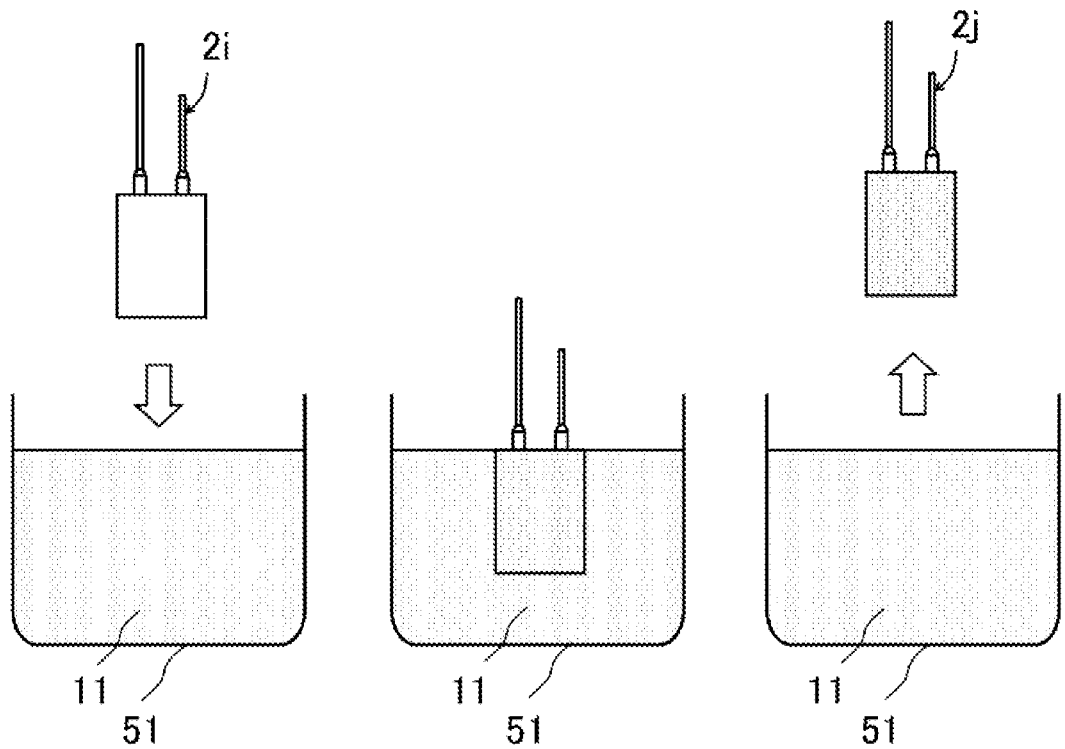
FIG. 4A is an illustration showing a preparation step in a chemical conversion treatment.
FIG. 4B is an illustration showing a dipping step subsequent to the preparation step in the chemical conversion treatment.
FIG. 4C is an illustration showing a lifting-up step subsequent to the dipping step in the chemical conversion treatment, in the present embodiment.

In the element forming step S2, for example, as shown in FIG. 3, the separator 2d is disposed between the anode foil 2a and the cathode foil 2c, so as to provide a state where the electrode foils are separated from each other, and the anode foil 2a and the cathode foil 2c are wound with the separator 2d intervening therebetween, so as to form into a cylindrical shape. A tape, a film, or the like is adhered to the outer periphery of the cylindrical shape, so as to retain the wound state (not shown in the figure). In the chemical conversion treatment in the element forming step S2, for example, as shown in FIG. 4A, a chemical conversion liquid tank 51 having a chemical conversion liquid 11 placed therein is prepared, and then as shown in FIG. 4B, a capacitor element 2i before the chemical conversion treatment is dipped in the chemical conversion liquid 11 in the chemical conversion liquid tank 51, and simultaneously a prescribed voltage is applied between the lead-out terminal 5f and the chemical conversion liquid 11 for a prescribed period of time. For example, a voltage of 100 V is applied for 5 minutes, so that the oxide film defect part that exists at the end of the anode foil 2a and the oxide film defect part that may exist on the surface thereof are repaired (not shown in the figure). As shown in FIG. 4C, the capacitor element is then lifted up from the chemical conversion liquid tank 51, and dried to provide a capacitor element 2j after the chemical conversion treatment. Examples of the chemical conversion liquid 11 include water solutions of ammonium adipate, ammonium pentaborate, ammonium phosphate, ammonium glutarate, ammonium azelate, ammonium tartrate, ammonium sebacate, ammonium pimelate, ammonium suberate, and the like.

In the first introducing step S3, a dispersing liquid containing the electroconductive polymer compound 2e in a fine particle form and the first water-soluble compound 2f1 is introduced to the capacitor element 2j after the chemical conversion treatment, and dried to form the solid electrolyte 20. The medium of the dispersing liquid may be water, a water-soluble liquid, or both of them.

In the first introducing step S3, for example, a shown in FIG. 5A, a dispersing liquid tank 52 having a dispersing liquid 12 placed therein is prepared, and then as shown in FIG. 5B, the capacitor element 2j after the chemical conversion treatment is dipped in the dispersing liquid 12 in the dispersing liquid tank 52. As shown in FIG. 5C, the capacitor element is then lifted up from the dispersing liquid tank 52, and dried to provide a capacitor element 2k after the first introducing treatment. The number of times of drying may be once or twice or more, and the first introducing step S3 may be repeated multiple times in some cases.

In the present embodiment, the concentration of the electroconductive polymer compound 2e in the dispersing liquid 12 is, for example, 0.1 vol % or more and 10 vol % or less. In the case where the concentration of the electroconductive polymer compound 2e is less than 0.1 vol %, there is a possibility that the target electrical characteristics of the capacitor are not exerted due to the small amount of the electroconductive polymer compound 2e. In the case where the concentration of the electroconductive polymer compound 2e exceeds 10 vol %, on the other hand, there is a possibility that the electroconductive polymer compound 2e is not dispersed uniformly in the dispersing liquid 12. From this standpoint, the concentration of the electroconductive polymer compound 2e is preferably 1 vol % or more, and the concentration of the electroconductive polymer compound 2e is more preferably 2 vol % or more. The concentration of the electroconductive polymer compound 2e is preferably 7 vol % or less, and the concentration of the electroconductive polymer compound 2e is more preferably 3 vol % or less.

Figures 6A, 6B, 6C:
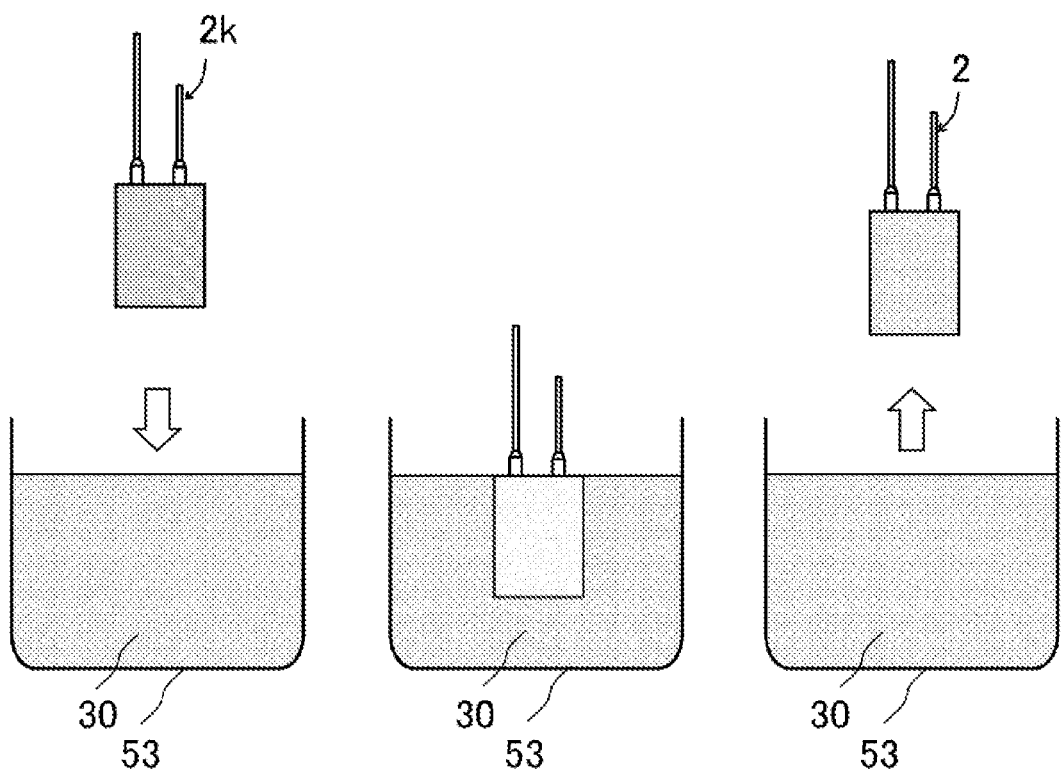
FIG. 6A is an illustration showing a preparation step in a water-soluble compound solution introducing treatment.
FIG. 6B is an illustration showing a dipping step subsequent to the preparation step in the water-soluble compound solution introducing treatment.
FIG. 6C is an illustration showing a lifting-up step subsequent to the dipping step in the water-soluble compound solution introducing treatment, in the present embodiment.

In the second introducing step S4, the water-soluble compound solution containing the second water-soluble compound 2f2 capable of repairing the oxide film 2b of the anode foil 2a is introduced. For example, as shown in FIG. 6A, a solution tank 53 having the water-soluble compound solution 30 containing the second water-soluble compound 2f2 capable of repairing the oxide film 2b of the anode foil 2a placed therein is prepared. As shown in FIG. 6B, the capacitor element 2k having the solid electrolyte 20 formed therein is then dipped in the water-soluble compound solution 30 in the solution tank 53. As shown in FIG. 6C, the capacitor element is then lifted up from the solution tank 53, and provide a capacitor element 2 after introducing the water-soluble compound solution 30.

In the second introducing step S4, for example, a liquid that does not contain the first water-soluble compound 2f1 is used as the water-soluble compound solution 30. According to the configuration, the water-soluble compound solution 30 can be readily prepared, and the proportion of the polyol compound in the solid electrolytic capacitor 1 can be regulated with good accuracy, resulting in less fluctuation of the electric characteristics, such as the electrostatic capacity, the dielectric loss tangent (tan δ), the ESR, and the dielectric breakdown voltage.

In the fitting step S5, for example, as shown in FIG. 7A, the case 4 and the sealing part 3 are prepared, and then as shown in FIG. 7B, the capacitor element 2 after introducing the water-soluble compound solution 30 is housed in the case 4, and simultaneously the round bar part of the lead terminal 5 and the round bar part of the lead terminal 6 are fit to the through holes at two positions of the sealing part 3 respectively. According to the procedure, the case 4 and the sealing part 3 are in a fit state as shown in FIG. 7C.

In the sealing step S6, for example, the opening side of the case 4 is crimped to form a side throttling part on the side surface on the opening side of the case 4, and also the end on the opening side thereof is bent. Through the crimping work, the sealing part 3 is supported and fixed with the side throttling part and the end on the opening side of the case 4 as shown in FIG. 2.

Accordingly, the configuration in which the sealing part 3 and the capacitor element 2 are housed in the case 4 having a shape with a bottom, and the sealing part 3 is supported and fixed through the forming work on the opening side of the case 4 is achieved.

In the aging step S7, after sealing the opening side of the case 4 with the sealing part 3, the lead terminal 5, and the lead terminal 6, an external sleeve is mounted on the case 4, and then the external sleeve is heat-treated, and simultaneously an aging treatment is performed. In the aging treatment, a voltage is applied under a high temperature condition for a prescribed period of time, and thereby the metal matrix parts, such as the bonding part and the cross section of the anode foil 2a, and the weak parts of the oxide film 2b are again subjected to the chemical conversion through the oxide film repairing function of the water-soluble compound solution 30. According to the procedure, the state where the leak current is suppressed is stabilized. The aging treatment also has a debugging effect of removing an unexpected initial failure.

The solid electrolytic capacitor 1 of the present embodiment described above contains the electroconductive polymer compound 2e in a fine particle form, and the first water-soluble compound 2f1 the order of the molecular weight of which is close to the order of the molecular weight of the second water-soluble compound 2f2 and which has a large number of hydroxy groups, resulting in good contact to the oxide film 2b. Accordingly, a configuration in which the oxide film repairing capability of the first water-soluble compound 2f1 in the solid electrolyte 20 is further enhanced, and the leak current suppressing effect is enhanced is provided. Furthermore, with the water-soluble compound solution containing the second water-soluble compound 2f2 having an average molecular weight having an order regulated to provide good compatibility between the first water-soluble compound 2f1 in the solid electrolyte 20 and the water-soluble compound solution 30, i.e., regulated to be close to the order of the molecular weight of the first water-soluble compound 2f1, the solid electrolytic capacitor 1 having the configuration in which the target electrostatic capacity is achieved, the ESR at the use frequency is reduced than before, and the oxide film repairing capability is enhanced to enhance the leak current reducing effect is provided. Furthermore, even in the case where the oxide film repairing capability of the first water-soluble compound 2f1 in the solid electrolyte 20 is impaired, the second water-soluble compound 2f2 in the water-soluble compound solution 30 supplements the similar oxide film repairing capability, thereby retaining the oxide film repairing capability for a long period of time. Accordingly, the solid electrolytic capacitor 1 having a structure having an excellent anode oxide film repairing capability, and achieving a reduced leak current, an increased electrostatic capacity, and the ESR at the use frequency reduced than before can be provided.

Subsequently, Examples 1 to 4 of the solid electrolytic capacitor 1 will be described below.

Example 1

In Example 1, a dispersing liquid obtained by dispersing poly(3,4-ethylene dioxythiophene) doped with poly(4-styrenesulfonic acid) (PEDOT/PSS) as the electroconductive polymer compound 2e in a fine particle form in water, to which diglycerin as the first water-soluble compound 2/1 was added, was used. The dispersing liquid was prepared to make a content of diglycerin in the solid electrolyte 20 of 91 wt %. Ethylene glycol having an average molecular weight of 62 was used as the second water-soluble compound 2/2, and a mixture of ethylene glycol and water was used as the water-soluble compound solution 30. The proportion of ethylene glycol in the water-soluble compound solution 30 was 99 wt %, and the proportion of water therein was 1 wt %.

The manufacturing method in Example 1 was in accordance with the aforementioned embodiment, and an anode foil 2a having a lead terminal 5 bonded thereto and a cathode foil 2c having a lead terminal 6 bonded thereto were wound with a separator 2d intervening therebetween, so as to form a wound capacitor element 2. Subsequently, the capacitor element 2 was dipped in an ammonium adipate water solution, and simultaneously a voltage of 100 V was applied between the lead terminal 5 on the side of the anode foil 2a and chemical conversion liquid for 5 minutes, so as to repair an oxide film defect part existing at the end of the anode foil 2a and an oxide film defect part on the surface of the anode foil 2a, followed by drying at a temperature of 105° C. for 5 minutes.

Subsequently, a solid electrolyte 20 containing an electroconductive polymer compound 2e in a fine particle form and a first water-soluble compound 2/1 was formed in the gap between the anode foil 2a and the cathode foil 2c in the capacitor element 2. A water-soluble compound solution 30 containing a second water-soluble compound 2/2 and water was introduced to surround the solid electrolyte 20 to the gap between the anode foil 2a and the cathode foil 2c. The solid electrolyte 20 had a configuration containing the electroconductive polymer compound 2e in an amount of 2 wt % or more and simultaneously containing the first water-soluble compound 2/1 in an amount of 98 wt % or less, and the water-soluble compound solution 30 has a configuration containing water in an amount of 0.5 wt % or more and simultaneously containing the second water-soluble compound 2/2 in an amount of 99.5 wt % or less.

By using a sealing part 3 formed of isobutylene-isoprene rubber, the round bar parts of the lead terminal 5 and the lead terminal 6 of the capacitor element 2 were fit to the through holes of the sealing part 3 respectively, and simultaneously the capacitor element 2 is inserted to a case 4, followed by supporting and fixing the sealing part 3 through crimping work at the vicinity of the opening of the case 4.

An aging treatment was then performed by applying a prescribed voltage at a temperature of approximately 85° C. for 60 minutes, so as to manufacture a solid electrolytic capacitor 1 having a rated voltage of 25 WV.

Example 2

In Example 2, diethylene glycol having an average molecular weight of 106 was used as the second water-soluble compound 2/2, and a mixture of diethylene glycol and water was used as the water-soluble compound solution 30. The other configurations than the above were the same as in Example 1.

Example 3

In Example 3, polyethylene glycol having an average molecular weight of 200 (PEG 200) was used as the second water-soluble compound 2/2, and a mixture of the PEG 200 and water was used as the water-soluble compound solution 30. The other configurations than the above were the same as in Example 1.

Example 4

In Example 4, polyethylene glycol having an average molecular weight of 300 (PEG 300) was used as the second water-soluble compound 2/2, and a mixture of the PEG 300 and water was used as the water-soluble compound solution 30. The other configurations than the above were the same as in Example 1.

Subsequently, solid electrolytic capacitors of Comparative Examples 1 to 3 prototyped in parallel to prototyping Examples 1 to 4 above will be described below.

Comparative Example 1

In Comparative Example 1, a water-soluble compound solution corresponding to the water-soluble compound solution 30 was not used. The other configurations than the above were the same as in Example 1.

Comparative Example 2

In Comparative Example 2, polyethylene glycol having an average molecular weight of 400 (PEG 400) was used, and a mixture of the PEG 400 and water was used as the water-soluble compound solution. The other configurations than the above were the same as in Example 1.

Comparative Example 3

In Comparative Example 3, polyethylene glycol having an average molecular weight of 600 (PEG 600) was used, and a mixture of the PEG 600 and water was used as the water-soluble compound solution. The other configurations than the above were the same as in Example 1.

The solid electrolytic capacitors 1 of Examples 1 to 4 and the solid electrolytic capacitors of Comparative Examples 1 to 3 were measured for the electrostatic capacity at a frequency of 120 Hz, the electrostatic capacity at a frequency of 10 kHz, the ESR at a frequency of 10 kHz, and the ESR at a frequency of 100 kHz. The solid electrolytic capacitors were subjected to reflowing at a peak temperature of 260° C. for 10 seconds twice, and measured for the leak current (μA). The solid electrolytic capacitors were subjected to a high temperature test at a temperature of 125° C. for 500 hours, and measured for the electrostatic capacity at a frequency of 120 Hz before and after the high temperature test, and the change rate of the electrostatic capacity ΔC/C (%) was calculated from the electrostatic capacity before the high temperature test as the denominator and the change rate of the electrostatic capacity after the high temperature test as the numerator. The measurement results are shown in Table 1.

tive Example 3 using the water-soluble compound having an average molecular weight of 600. Examples 1 to 4 each have a change rate of the electrostatic capacity ΔC/C after the high temperature test within zero and −4%, as compared to Comparative Example 2 using the water-soluble compound having an average molecular weight of 400 and Compara-

TABLE 1

| | Solid electrolyte First water-soluble compound | Water-soluble compound solution Second water-soluble compound | Capacitance at 120 Hz [μF] | Capacitance at 10 kHz [μF] | ESR at 10 kHz [mΩ] | ESR at 100 kHz [mΩ] | Reflow test Leak Current [μA] | High temperature test Δ C./C. [%] |
|---|---|---|---|---|---|---|---|---|
| Comparative Example 1 | diglycerin | none | 290 | 250 | 15.7 | 10.2 | 9.9 | — |
| Example 1 | diglycerin | ethylene glycol | 298 | 276 | 12.8 | 9.9 | 5.0 | −2.1 |
| Example 2 | diglycerin | diethylene glycol | 293 | 270 | 13.4 | 10.1 | 5.4 | −1.9 |
| Example 3 | diglycerin | PEG200 | 287 | 260 | 14.4 | 10.5 | 5.3 | −2.2 |
| Example 4 | diglycerin | PEG300 | 286 | 254 | 15.2 | 10.7 | 6.3 | −3.2 |
| Comparative Example 2 | diglycerin | PEG400 | 282 | 252 | 15.7 | 10.9 | 6.7 | −4.4 |
| Comparative Example 3 | diglycerin | PEG600 | 281 | 250 | 16.0 | 11.0 | 8.3 | −4.7 |

As shown in Table 1, Examples 1 to 4 each have reduced ESR at a frequency of 10 kHz and an increased electrostatic capacity at a frequency of 10 kHz, as compared to Comparative Example 1 using no water-soluble compound solution, Comparative Example 2 using the water-soluble compound having an average molecular weight of 400, and Comparative Example 3 using the water-soluble compound having an average molecular weight of 600. Examples 1 to 4 each have reduced ESR at a frequency of 100 kHz and an increased electrostatic capacity at a frequency of 120 Hz, as compared to Comparative Example 2 using the water-soluble compound having an average molecular weight of 400 and Comparative Example 3 using the water-soluble compound having an average molecular weight of 600.

It has been found from the results in Table 1 that Examples 1 to 4 each have reduced ESR at a frequency of 100 kHz and an increased electrostatic capacity at a frequency of 120 Hz. This is because the orders of the molecular weights are regulated to make the orders of the molecular weight of the second water-soluble compound 2/2 and the molecular weight of the first water-soluble compound 2/1 close to each other. Furthermore, this is also because diglycerin as the first water-soluble compound 2/1 positively contained in the solid electrolyte achieves the structure in which a uniform solid electrolyte is formed on the oxide film 2b of the anode foil 2a, and simultaneously one or more kind of polyethylene glycol having an average molecular weight of less than 400 in a liquid form, diethylene glycol, and ethylene glycol as the second water-soluble compound 2/2 contained in the water-soluble compound solution 30 drastically enhances the compatibility with diglycerin in the solid electrolyte 20 resulting in good contact with the oxide film, so as to provide the structure in which the anode oxide film repairing capability of the water-soluble compound solution 30 is sufficiently exerted, resulting in the further enhanced leak current reducing effect.

As shown in Table 1, Examples 1 to 4 each have a reduced leak current after reflowing, as compared to Comparative Example 1 using no water-soluble compound solution, Comparative Example 2 using the water-soluble compound having an average molecular weight of 400, and Comparative Example 3 using the water-soluble compound having an average molecular weight of 600.

It has been found from the results in Table 1 that Examples 1 to 4 each have a reduced leak current after reflowing and a reduced change rate of the electrostatic capacity ΔC/C after the high temperature test. This is because the orders of the average molecular weights are regulated to make the orders of the molecular weight of the second water-soluble compound 2/2 and the molecular weight of the first water-soluble compound 2/1 close to each other, and thereby the oxide film repairing capability of the first water-soluble compound 2/1 in the solid electrolyte 20 is further enhanced to reduce the leak current, and the water-soluble compound solution 30 containing the second water-soluble compound 2/2 having the regulated order of the average molecular weight enhances the oxide film repairing capability to enhance the leak current reducing effect. Furthermore, even in the case where the oxide film repairing capability of the first water-soluble compound 2/1 in the solid electrolyte 20 is impaired, the second water-soluble compound 2/2 in the water-soluble compound solution 30 supplements the similar oxide film repairing function, thereby retaining the oxide film repairing capability for a long period of time.

Subsequently, Example 5 of the solid electrolytic capacitor 1 will be described below.

Example 5

In Example 5, a dispersing liquid obtained by dispersing poly(3,4-ethylene dioxythiophene) doped with poly(4-styrenesulfonic acid) (PEDOT/PSS) as the electroconductive polymer compound 2e in a fine particle form in water, to which diglycerin as the first water-soluble compound 2/1 was added, was used. The dispersing liquid was prepared to make a content of diglycerin in the solid electrolyte 20 of 91 wt %. A mixture of polyethylene glycol having an average molecular weight of 250 (PEG 250) as the second water-soluble compound 2/2 and water was used as the water-soluble compound solution 30. In this example, the proportion of the PEG 250 in the water-soluble compound solution 30 was 99 wt %, and the proportion of water therein was 1 wt %. The manufacturing method in this example was the same as in Example 1 except that the mixture of the PEG 250 and water was used as the water-soluble compound solution 30.

Subsequently, solid electrolytic capacitors of Comparative Examples 4 to 7 prototyped in parallel to prototyping Example 5 above will be described below.

Comparative Example 4

In Comparative Example 4, a water-soluble compound solution corresponding to the water-soluble compound solution 30 was not used. The other configurations than the above were the same as in Example 5.

Comparative Example 5

In Comparative Example 5, a dispersing liquid obtained by dispersing poly (3,4-ethylene dioxythiophene) doped with poly(4-styrenesulfonic acid) (PEDOT/PSS) as the electroconductive polymer compound 2e in a fine particle form in water, to which glycerin was added, was used. The dispersing liquid was prepared to make a content of glycerin in the solid electrolyte of 91 wt %. Polyethylene glycol having an average molecular weight of 250 (PEG 250) was used as the second water-soluble compound, and a mixture of the PEG 250 and water was used as the water-soluble compound solution. The other configurations than the above were the same as in Example 5.

Comparative Example 6

In Comparative Example 6, a dispersing liquid obtained by dispersing poly (3,4-ethylene dioxythiophene) doped with poly (4-styrenesulfonic acid) (PEDOT/PSS) as the electroconductive polymer compound 2e in a fine particle form in water, to which polyglycerin (molecular weight: 310) was added, was used. The dispersing liquid was prepared to make a content of polyglycerin in the solid electrolyte of 91 wt %. A mixture of polyethylene glycol in a liquid form having an average molecular weight of 250 (PEG 250) as the second water-soluble compound and water was used as the water-soluble compound solution. The other configurations than the above were the same as in Example 5.

Comparative Example 7

In Comparative Example 7, a dispersing liquid obtained by dispersing poly(3,4-ethylene dioxythiophene) doped with poly(4-styrenesulfonic acid) (PEDOT/PSS) as the electroconductive polymer compound 2e in a fine particle form in water, to which polyglycerin (molecular weight: 500) was added, was used. The dispersing liquid was prepared to make a content of polyglycerin in the solid electrolyte of 91 wt %. A mixture of polyethylene glycol in a liquid form having an average molecular weight of 250 (PEG 250) as the second water-soluble compound and water was used as the water-soluble compound solution. The other configurations than the above were the same as in Example 5.

The solid electrolytic capacitor 1 of Example 5 and the solid electrolytic capacitors of Comparative Examples 4 to 7 were measured for the electrostatic capacity at a frequency of 120 Hz and the ESR at a frequency of 100 kHz. The measurement results are shown in Table 2.

TABLE 2

| | average values (n = 10) | | | |
|---|---|---|---|---|
| | Solid electrolyte First water-soluble compound | Water-soluble compound solution Second water-soluble compound | Capacitance at 120 Hz [μF] | ESR at 100 kHz [mΩ] |
| Comparative Example 4 | diglycerin (molecular weight 166) | none | 182 | 12.4 |
| Example 5 | diglycerin (molecular weight 166) | PEG250 | 187 | 12.4 |
| Comparative Example 5 | glycerin (molecular weight 92) | PEG250 | 181 | 13.4 |
| Comparative Example 6 | polyglycerin (molecular weight 310) | PEG250 | 181 | 13.4 |
| Comparative Example 7 | polyglycerin (molecular weight 500) | PEG250 | 181 | 13.7 |

As shown in Table 2, Example 5 has an increased electrostatic capacity at a frequency of 120 Hz, as compared to Comparative Example 4 containing no water-soluble compound solution. Example 5 has an increased electrostatic capacity at a frequency of 120 Hz and decreased ESR at a frequency of 100 kHz, as compared to Comparative Examples 5 to 7 containing glycerin, polyglycerin (molecular weight: 310), and polyglycerin (molecular weight: 500) as the second water-soluble compound respectively.

Subsequently, Examples 6 to 9 of the solid electrolytic capacitor 1 will be described below.

Example 6

In Example 6, a dispersing liquid obtained by dispersing poly(3,4-ethylene dioxythiophene) doped with poly(4-styrenesulfonic acid) (PEDOT/PSS) as the electroconductive polymer compound 2e in a fine particle form in water, to which diglycerin as the first water-soluble compound 2/1 was added, was used. The dispersing liquid was prepared to make a content of diglycerin in the solid electrolyte 20 of 83 wt %. Polyethylene glycol in a liquid form having an average molecular weight of 250 (PEG 250) was used as the second water-soluble compound 2/2, and a mixture of the PEG 250 and water was used as the water-soluble compound solution 30. In this example, the proportion of the PEG 250 in the water-soluble compound solution 30 was 99 wt %, and the proportion of water therein was 1 wt %. The manufacturing method in this example was the same as in Example 1 except for the difference in specification, i.e., the dispersing liquid was prepared to make a content of diglycerin in the solid electrolyte 20 of 83 wt %, and the mixture of the PEG 250 and water was used as the water-soluble compound solution 30.

Example 7

In Example 7, a dispersing liquid obtained by dispersing poly(3,4-ethylene dioxythiophene) doped with poly(4-styrenesulfonic acid) (PEDOT/PSS) as the electroconductive polymer compound 2e in a fine particle form in water, to which diglycerin as the first water-soluble compound 2/1 was added, was used. The dispersing liquid was prepared to make a content of diglycerin in the solid electrolyte 20 of 91 wt %. The other configurations than the above were the same as in Example 6.

Example 8

In Example 8, a dispersing liquid obtained by dispersing poly(3,4-ethylene dioxythiophene) doped with poly(4-styrenesulfonic acid) (PEDOT/PSS) as the electroconductive polymer compound 2e in a fine particle form in water, to which diglycerin as the first water-soluble compound 2/1 was added, was used. The dispersing liquid was prepared to make a content of diglycerin in the solid electrolyte 20 of 94 wt %. The other configurations than the above were the same as in Example 6.

Example 9

In Example 9, a dispersing liquid obtained by dispersing poly(3,4-ethylene dioxythiophene) doped with poly(4-styrenesulfonic acid) (PEDOT/PSS) as the electroconductive polymer compound 2e in a fine particle form in water, to which diglycerin as the first water-soluble compound 2/1 was added, was used. The dispersing liquid was prepared to make a content of diglycerin in the solid electrolyte 20 of 95 wt %. The other configurations than the above were the same as in Example 6.

The solid electrolytic capacitors of Examples 6 to 9 were measured for the electrostatic capacity at a frequency of 120 Hz, the electrostatic capacity at a frequency of 10 kHz, the ESR at a frequency of 10 kHz, and the ESR at a frequency of 100 kHz. The measurement results are shown in Table 3.

TABLE 3

| | Solid electrolyte First water-soluble compound | Water-soluble compound solution Second water-soluble compound | Capacitance at 120 Hz [µF] | Capacitance at 10 kHz [µF] | ESR at 10 kHz [mΩ] | ESR at 100 kHz [mΩ] |
|---|---|---|---|---|---|---|
| | | average values (n = 10) | | | | |
| Example 6 | diglycerin | PEG250 | 300 | 266 | 17.3 | 12.2 |
| Example 7 | diglycerin | PEG250 | 298 | 270 | 14.3 | 10.4 |
| Example 8 | diglycerin | PEG250 | 297 | 266 | 14.4 | 10.2 |
| Example 9 | diglycerin | PEG250 | 291 | 253 | 15.6 | 10.3 |

As shown in Table 3, Examples 6 to 9 each have an increased electrostatic capacity at a frequency of 120 Hz, decreased ESR at a frequency of 10 kHz, and decreased ESR at a frequency of 100 kHz.

Subsequently, Examples 10 to 14 of the solid electrolytic capacitor 1 will be described below.

Example 10

In Example 10, a dispersing liquid obtained by dispersing poly(3,4-ethylene dioxythiophene) doped with poly(4-styrenesulfonic acid) (PEDOT/PSS) as the electroconductive polymer compound 2e in a fine particle form in water, to which diglycerin as the first water-soluble compound 2/1 was added, was used. The dispersing liquid was prepared to make a content of diglycerin in the solid electrolyte 20 of 91 wt %. Ethylene glycol having an average molecular weight of 62 was used as the second water-soluble compound 2/2, and a mixture of ethylene glycol and water was used as the water-soluble compound solution 30. This example was the same as in Example 1 except for the difference in production lot.

Example 11

In Example 11, diethylene glycol having an average molecular weight of 106 was used as the second water-soluble compound 2/2, and a mixture of diethylene glycol and water was used as the water-soluble compound solution 30. The other configurations than the above were the same as in Example 10.

Example 12

In Example 12, triethylene glycol having an average molecular weight of 150 was used as the second water-soluble compound 2/2, and a mixture of triethylene glycol and water was used as the water-soluble compound solution 30. The other configurations than the above were the same as in Example 10.

Example 13

In Example 13, polyethylene glycol having an average molecular weight of 200 (PEG 200) was used as the second water-soluble compound 2/2, and a mixture of the PEG 200 and water was used as the water-soluble compound solution 30. The other configurations than the above were the same as in Example 10.

Example 14

In Example 14, polyethylene glycol having an average molecular weight of 300 (PEG 300) was used as the second water-soluble compound 2/2, and a mixture of the PEG 300 and water was used as the water-soluble compound solution 30. The other configurations than the above were the same as in Example 10.

Subsequently, solid electrolytic capacitors of Comparative Examples 8 to prototyped in parallel to prototyping Examples 10 to 14 above will be described below.

Comparative Example 8

In Comparative Example 8, a water-soluble compound solution corresponding to the water-soluble compound solution 30 was not used. The other configurations than the above were the same as in Example 10.

Comparative Example 9

In Comparative Example 9, polyethylene glycol having an average molecular weight of 400 (PEG 400) was used, and a mixture of the PEG 400 and water was used as the water-soluble compound solution. The other configurations than the above were the same as in Example 10.

Comparative Example 10

In Comparative Example 10, polyethylene glycol having an average molecular weight of 600 (PEG 600) was used, and a mixture of the PEG 600 and water was used as the water-soluble compound solution. The other configurations than the above were the same as in Example 10.

The solid electrolytic capacitors 1 of Examples 10 to 14 and the solid electrolytic capacitors of Comparative Examples 8 to 10 were measured for the electrostatic capacity at a frequency of 120 Hz, the electrostatic capacity at a frequency of 10 kHz, the ESR at a frequency of 10 kHz, the ESR at a frequency of 100 kHz, and the leak current ($\mu$A). The measurement results are shown in Table 4. FIGS. 9A, 9B, 10A, 10B, and 11 are graphs showing the results in Table 4.

TABLE 4

| | Solid electrolyte First water-soluble compound | Water-soluble compound solution Second water-soluble compound | Capacitance at 120 Hz [$\mu$F] | Capacitance at 10 kHz [$\mu$F] | ESR at 10 kHz [m$\Omega$] | ESR at 100 kHz [m$\Omega$] | Leak Current [$\mu$A] |
|---|---|---|---|---|---|---|---|
| | Initial characteristics average values (n = 20) | | | | | | |
| Comparative Example 8 | diglycerin | none | 290 | 249 | 15.6 | 10.0 | 5.6 |
| Example 10 | diglycerin | ethylene glycol | 301 | 278 | 12.7 | 9.8 | 4.3 |
| Example 11 | diglycerin | diethylene glycol | 296 | 271 | 13.3 | 10.0 | 4.2 |
| Example 12 | diglycerin | triethylene glycol | 294 | 266 | 13.8 | 10.1 | 4.4 |
| Example 13 | diglycerin | PEG200 | 289 | 261 | 14.3 | 10.3 | 4.6 |
| Example 14 | diglycerin | PEG300 | 287 | 254 | 15.1 | 10.6 | 5.2 |
| Comparative Example 9 | diglycerin | PEG400 | 285 | 250 | 15.6 | 10.7 | 5.2 |
| Comparative Example 10 | diglycerin | PEG600 | 283 | 248 | 15.5 | 11.0 | 5.8 |

As shown in Table 4 and FIGS. 9A, 9B, 10A, 10B, and 11, Examples 10 to 14 each have an increased electrostatic capacity at a frequency of 120 Hz, an increased electrostatic capacity at a frequency of 10 kHz, reduced ESR at a frequency of 10 kHz, reduced ESR at a frequency of 100 kHz, and a reduced leak current ($\mu$A), as compared to Comparative Examples 8 to 10.

The solid electrolytic capacitors 1 of Examples 10 to 14 and the solid electrolytic capacitors of Comparative Examples 8 to 10 (10 capacitors for each) were subjected to a high temperature test under no load at a temperature of 150° C., and the solid electrolytic capacitors after the test for 1,000 hours each were measured for the electrostatic capacity at a frequency of 120 Hz, the electrostatic capacity at a frequency of 10 kHz, the ESR at a frequency of 10 kHz, the ESR at a frequency of 100 kHz, and the leak current ($\mu$A). The measurement results are shown in Table 5.

TABLE 5

| | Solid electrolyte First water-soluble compound | Water-soluble compound solution Second water-soluble compound | Capacitance at 120 Hz [$\mu$F] | Capacitance at 10 kHz [$\mu$F] | ESR at 10 kHz [m$\Omega$] | ESR at 100 kHz [m$\Omega$] | Leak Current [$\mu$A] |
|---|---|---|---|---|---|---|---|
| | After test under no load at temperature of 150° C. for 1,000 hours average values (n = 10) | | | | | | |
| Comparative Example 8 | diglycerin | none | 274 | 218 | 21.4 | 12.6 | 13.5 |
| Example 10 | diglycerin | ethylene glycol | 290 | 263 | 16.5 | 12.3 | 6.4 |
| Example 11 | diglycerin | diethylene glycol | 287 | 256 | 16.5 | 12.3 | 5.6 |
| Example 12 | diglycerin | triethylene glycol | 282 | 247 | 17.9 | 12.5 | 6.5 |
| Example 13 | diglycerin | PEG200 | 276 | 233 | 19.4 | 12.7 | 11.8 |
| Example 14 | diglycerin | PEG300 | 269 | 218 | 21.0 | 13.2 | 10.4 |
| Comparative Example 9 | diglycerin | PEG400 | 261 | 209 | 21.4 | 13.2 | 16.0 |
| Comparative Example 10 | diglycerin | PEG600 | 258 | 205 | 20.2 | 13.7 | 14.8 |

As shown in Table 5, Examples 10 to 14 show good characteristics even after the high temperature test. In particular, the examples containing triethylene glycol, diethylene glycol, or ethylene glycol as the second water-soluble compound 212 in the water-soluble compound solution 30 each have an increased electrostatic capacity at a frequency of 120 Hz, an increased electrostatic capacity at a frequency of 10 kHz, reduced ESR at a frequency of 10 kHz, reduced ESR at a frequency of 100 kHz, and a reduced leak current (pA), even after the high temperature test.

Subsequently, the solid electrolytic capacitors 1 of Examples 10 to 14 and the solid electrolytic capacitors of Comparative Examples 8 to 10 (10 capacitors for each) were continued to subject to the high temperature test under no load at a temperature of 150° C., and the solid electrolytic capacitors after the test for 3,000 hours each were measured for the electrostatic capacity at a frequency of 120 Hz, the electrostatic capacity at a frequency of 10 kHz, the ESR at a frequency of 10 kHz, the ESR at a frequency of 100 kHz, and the leak current (μA). The measurement results are shown in Table 6.

TABLE 6

After test under no load at temperature of 150° C. for 3,000 hours average values (n = 10)

| | Solid electrolyte First water-soluble compound | Water-soluble compound solution Second water-soluble compound | Capacitance at 120 Hz [μF] | Capacitance at 10 kHz [μF] | ESR at 10 kHz [mΩ] | ESR at 100 kHz [mΩ] | Leak Current [μA] |
|---|---|---|---|---|---|---|---|
| Comparative Example 8 | diglycerin | none | 260 | 197 | 22.6 | 13.6 | 20.2 |
| Example 10 | diglycerin | ethylene glycol | 285 | 256 | 17.6 | 13.1 | 11.7 |
| Example 11 | diglycerin | diethylene glycol | 283 | 250 | 18.0 | 13.0 | 9.4 |
| Example 12 | diglycerin | triethylene glycol | 278 | 242 | 19.5 | 13.3 | 11.3 |
| Example 13 | diglycerin | PEG200 | 268 | 218 | 21.7 | 13.3 | 19.0 |
| Example 14 | diglycerin | PEG300 | 259 | 202 | 23.2 | 14.0 | 20.1 |
| Comparative Example 9 | diglycerin | PEG400 | 246 | 191 | 22.0 | 14.2 | 47.1 |
| Comparative Example 10 | diglycerin | PEG600 | 235 | 186 | 20.3 | 14.4 | 27.5 |

As shown in Table 6, Examples 10 to 14 show good characteristics even after the high temperature test. In particular, the examples containing triethylene glycol, diethylene glycol, or ethylene glycol as the second water-soluble compound 2f2 in the water-soluble compound solution 30 each have an increased electrostatic capacity at a frequency of 120 Hz, an increased electrostatic capacity at a frequency of 10 kHz, reduced ESR at a frequency of 10 kHz, reduced ESR at a frequency of 100 kHz, and a reduced leak current (μA), even after the high temperature test.

Furthermore, the solid electrolytic capacitors 1 of Examples 10 to 14 and the solid electrolytic capacitors ofComparative Examples 8 to 10 (10 capacitors for each) were subjected to a high temperature test under a load voltage of 25 V at a temperature of 150° C., and the solid electrolytic capacitors after the test for 1,000 hours each were measured for the electrostatic capacity at a frequency of 120 Hz, the electrostatic capacity at a frequency of 10 kHz, the ESR at a frequency

TABLE 7

After test under load voltage of 25 V at temperature of 150° C. for 1,000 hours average values (n = 10)

| | Solid electrolyte First water-soluble compound | Water-soluble compound solution Second water-soluble compound | Capacitance at 120 Hz [μF] | Capacitance at 10 kHz [μF] | ESR at 10 kHz [mΩ] | ESR at 100 kHz [mΩ] | Leak Current [μA] |
|---|---|---|---|---|---|---|---|
| Comparative Example 8 | diglycerin | none | 278 | 222 | 19.9 | 11.8 | 5.5 |
| Example 10 | diglycerin | ethylene glycol | 293 | 265 | 16.9 | 12.7 | 5.7 |
| Example 11 | diglycerin | diethylene glycol | 289 | 261 | 15.9 | 11.7 | 5.2 |
| Example 12 | diglycerin | triethylene glycol | 286 | 253 | 17.1 | 11.9 | 5.9 |
| Example 13 | diglycerin | PEG200 | 279 | 240 | 18.7 | 12.3 | 7.2 |
| Example 14 | diglycerin | PEG300 | 271 | 221 | 20.5 | 12.8 | 7.8 |
| Comparative Example 9 | diglycerin | PEG400 | 265 | 211 | 20.6 | 12.9 | 8.7 |

TABLE 7-continued

After test under load voltage of 25 V at temperature of 150° C. for 1,000 hours average values (n = 10)

| | Solid electrolyte First water-soluble compound | Water-soluble compound solution Second water-soluble compound | Capacitance at 120 Hz [μF] | Capacitance at 10 kHz [μF] | ESR at 10 kHz [mΩ] | ESR at 100 kHz [mΩ] | Leak Current [μA] |
|---|---|---|---|---|---|---|---|
| Comparative Example 10 | diglycerin | PEG600 | 261 | 208 | 19.5 | 13.2 | 7.3 | of 10 kHz, the ESR at a frequency of 100 kHz, and the leak current (μA). The measurement results are shown in Table 7.

As shown in Table 7, Examples 10 to 14 show good characteristics even after the high temperature load test. In particular, the examples containing triethylene glycol, diethylene glycol, or ethylene glycol as the second water-soluble compound 212 in the water-soluble compound solution 30 each have an increased electrostatic capacity at a frequency of 120 Hz, an increased electrostatic capacity at a frequency of 10 kHz, and reduced ESR at a frequency of 10 kHz even after the high temperature load test.

Subsequently, the solid electrolytic capacitors 1 of Examples 10 to 14 and the solid electrolytic capacitors of Comparative Examples 8 to 10 (10 capacitors for each) were continued to subject to the high temperature test under a load voltage of 25 V at a temperature of 150° C., and the solid electrolytic capacitors

TABLE 8

After test under load voltage of 25 V at temperature of 150° C. for 3,000 hours average values (n = 10)

| | Solid electrolyte First water-soluble compound | Water-soluble compound solution Second water-soluble compound | Capacitance at 120 Hz [μF] | Capacitance at 10 kHz [μF] | ESR at 10 kHz [mΩ] | ESR at 100 kHz [mΩ] | Leak Current [μA] |
|---|---|---|---|---|---|---|---|
| Comparative Example 8 | diglycerin | none | 264 | 200 | 21.7 | 13.2 | 6.9 |
| Example 10 | diglycerin | ethylene glycol | 283 | 247 | 21.4 | 15.4 | 7.0 |
| Example 11 | diglycerin | diethylene glycol | 285 | 255 | 17.4 | 12.4 | 7.9 |
| Example 12 | diglycerin | triethylene glycol | 282 | 243 | 18.9 | 12.5 | 8.3 |
| Example 13 | diglycerin | PEG200 | 271 | 225 | 20.8 | 13.0 | 8.2 |
| Example 14 | diglycerin | PEG300 | 261 | 205 | 22.0 | 13.4 | 8.5 |
| Comparative Example 9 | diglycerin | PEG400 | 250 | 194 | 20.7 | 13.3 | 8.8 |
| Comparative Example 10 | diglycerin | PEG600 | 238 | 190 | 19.2 | 13.7 | 6.9 | after the test for 3,000 hours each were measured for the electrostatic capacity at a frequency of 120 Hz, the electrostatic capacity at a frequency of 10 kHz, the ESR at a frequency of 10 kHz, the ESR at a frequency of 100 kHz, and the leak current (μA). The measurement results are shown in Table 8.

As shown in Table 8, Examples 10 to 14 show good characteristics even after the high temperature load test. In particular, the examples containing triethylene glycol, diethylene glycol, or ethylene glycol as the second water-soluble compound 2/2 in the water-soluble compound solution 30 each have an increased electrostatic capacity at a frequency of 120 Hz, an increased electrostatic capacity at a frequency of 10 kHz, and reduced ESR at a frequency of 10 kHz, even after the high temperature load test.

Based on the measurement results of the solid electrolytic capacitors 1 of Examples 10 to 14 and the solid electrolytic capacitors of Comparative Examples 8 to 10 (10 capacitors for each) of the electrostatic capacity at a frequency of 120 Hz before and after the high temperature test under a load voltage of 25 V at a temperature of 150° C., the change rate of the electrostatic capacity ΔC/C (%) was

TABLE 9

After high temperature test under load voltage of 25 V at temperature of 150° C. average values (n = 10)

| | Solid electrolyte First water-soluble compound | Water-soluble compound solution Second water-soluble compound | after 1000 hours ΔC/C [%] | after 3000 hours ΔC/C [%] |
|---|---|---|---|---|
| Comparative Example 8 | diglycerin | none | −4.1 | −9.0 |
| Example 10 | diglycerin | ethylene glycol | −2.7 | −6.0 |
| Example 11 | diglycerin | diethylene glycol | −2.4 | −3.7 |
| Example 12 | diglycerin | triethylene glycol | −2.7 | −4.1 |
| Example 13 | diglycenn | PEG200 | −3.5 | −6.2 |
| Example 14 | diglycerin | PEG300 | −5.6 | −9.1 |
| Comparative Example 9 | diglycerin | PEG400 | −7.0 | −12.3 |

TABLE 9-continued

After high temperature test under load voltage of 25 V at temperature of 150° C. average values (n = 10)

Figure 12A:
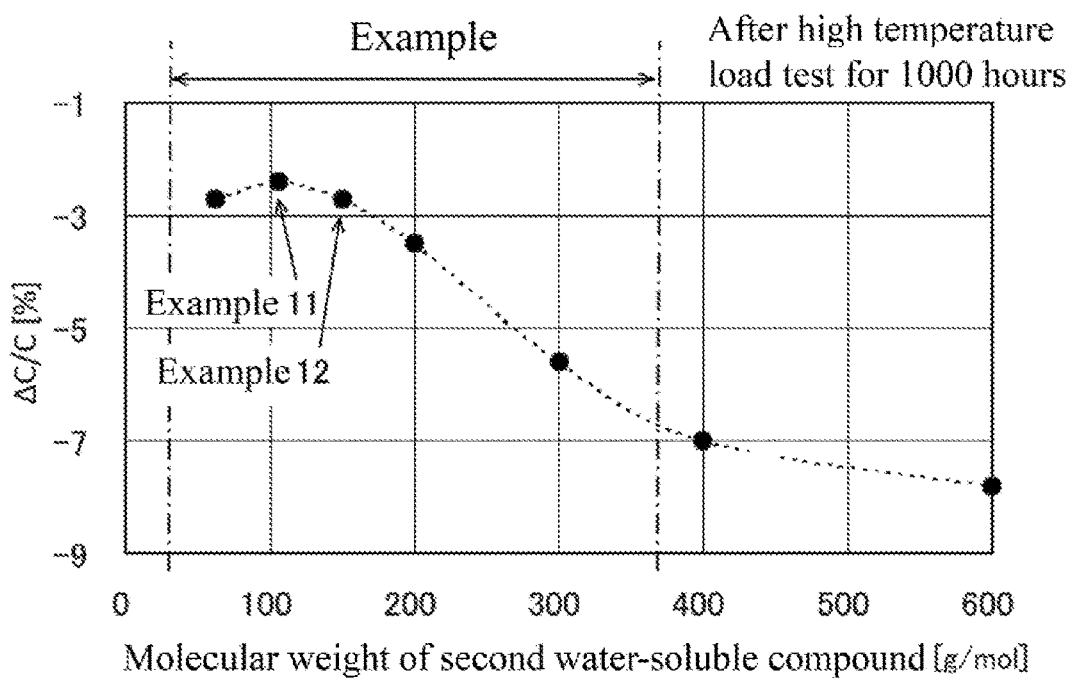
FIG. 12A is a graph showing by comparison the relationship between the average molecular weight of the second water-soluble compound and the change rate of the electrostatic capacity after the high temperature load test for 1,000 hours for Examples and Comparative Examples.
Figure 12B:
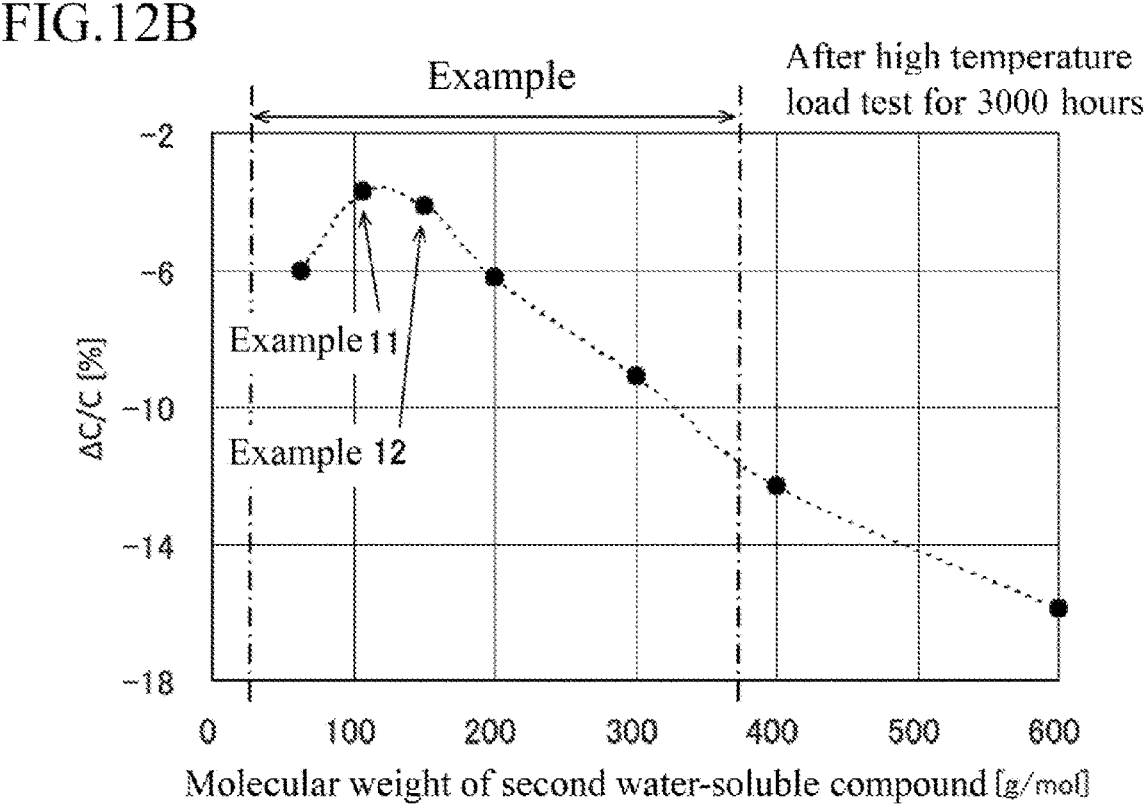
FIG. 12B is a graph showing by comparison the relationship between the average molecular weight of the second water-soluble compound and the change rate of the electrostatic capacity after the high temperature load test for 3,000 hours for Examples and Comparative Examples.

| | Solid electrolyte First water-soluble compound | Water-soluble compound solution Second water-soluble compound | after 1000 hours ΔC/C [%] | after 3000 hours ΔC/C [%] |
|---|---|---|---|---|
| Comparative Example 10 | digiycerin | PEG600 | −7.8 | −15.9 | calculated from the electrostatic capacity before the high temperature test as the denominator and the change rate of the electrostatic capacity after the high temperature test as the numerator. The measurement results are shown in Table 9. FIGS. 12A and 12B are graphs showing the results in Table 9.

As shown in Table 9 and FIGS. 12A and 12B, Examples 11 and 12 each have a change rate of the electrostatic capacity within zero and −5% even after the high temperature load test at 150° C. for 3,000 hours, and it has been found that the decrease rate of the electrostatic capacity can be suppressed to a particularly small value. It has also been found that as shown in Table 8, Examples 11 and 12 each have ESR at a frequency of 100 kHz of 12.5 mQ or less and particularly decreased the ESR at a frequency of 100 kHz, even after the high temperature load test at 150° C. for 3,000 hours. This is because the average molecular weight of the second water-soluble compound is regulated to more than 0.4 time and less than 1.2 times the molecular weight of the first water-soluble compound, and thereby the orders of the molecular weight of the second water-soluble compound 2/2 and the molecular weight of the first water-soluble compound 2/1 are close to each other.

The present invention is not limited to the aforementioned examples, and may be subjected to various modifications unless the modifications deviate from the present invention.

What is claimed is:

1. A solid electrolytic capacitor comprising:
   an anode foil having formed thereon an oxide film,
   a cathode foil, and
   a separator disposed between the anode foil and the cathode foil, and being equipped with
   a solid electrolyte formed of an electroconductive polymer compound in a fine particle form, and
   a water-soluble compound solution introduced to surround the solid electrolyte,
   the solid electrolyte contains diglycerin as a first water-soluble compound,
   the water-soluble compound solution containing one kind or multiple kinds of polyethylene glycol, diethylene glycol or ethylene glycol as a glycol compound in a liquid form as a second water-soluble compound,
   the second water-soluble compound having an average molecular weight of less than 400, and
   the water-soluble compound solution contains water in an amount of 0.5 wt % or more.

2. The solid electrolytic capacitor according to claim 1, wherein the average molecular weight of the second water-soluble compound is 106 or more and 300 or less.

3. The solid electrolytic capacitor according to claim 1, wherein the solid electrolyte contains diglycerin as the first water-soluble compound in an amount of 80 wt % or more.

4. The solid electrolytic capacitor according to claim 1, wherein the water-soluble compound solution has a configuration in which no ionic compound is contained.

5. A method for manufacturing a solid electrolytic capacitor having a configuration including an anode foil having formed thereon an oxide film, a cathode foil, a separator disposed between the anode foil and the cathode foil, and a solid electrolyte, the method comprising:
   forming the solid electrolyte in a gap between the anode foil and the cathode foil with a dispersing liquid containing an electroconductive polymer compound in a fine particle form and diglycerin as a first water-soluble compound, and
   then introducing a water-soluble compound solution containing one kind or multiple kinds of polyethylene glycol, diethylene glycol or ethylene glycol as a glycol compound in a liquid form as a second water-soluble compound to surround the formed solid electrolyte,
   the second water-soluble compound having an average molecular weight of less than 400, and
   the water-soluble compound solution contains water in an amount of 0.5 wt % or more.

6. The method of claim 5, wherein the average molecular weight of the second water-soluble compound is 106 or more and 300 or less.

* * * * *